(12) United States Patent
Joshi et al.

(10) Patent No.: US 9,388,090 B2
(45) Date of Patent: Jul. 12, 2016

(54) FAST IGNITION AND SUSTAINED COMBUSTION OF IONIC LIQUIDS

(71) Applicant: Physical Sciences, Inc., Andover, MA (US)

(72) Inventors: Prakash B. Joshi, Andover, MA (US); Lawrence G. Piper, Reading, MA (US); David B. Oakes, Reading, MA (US); Justin L. Sabourin, Somerville, MA (US); Adam J. Hicks, Melrose, MA (US); B. David Green, Methuen, MA (US); Anait Tsinberg, Somerville, MA (US); Allan Dokhan, Belmont, MA (US)

(73) Assignee: Physical Sciences, Inc., Andover, MA (US)

( * ) Notice: Subject to any disclaimer, the term of this patent is extended or adjusted under 35 U.S.C. 154(b) by 843 days.

(21) Appl. No.: 13/649,803

(22) Filed: Oct. 11, 2012

(65) Prior Publication Data

US 2013/0205751 A1    Aug. 15, 2013

Related U.S. Application Data

(60) Provisional application No. 61/547,515, filed on Oct. 14, 2011.

(51) Int. Cl.
| | | |
|---|---|---|
| *C06B 47/00* | (2006.01) | |
| *C06B 31/00* | (2006.01) | |
| *C06B 29/00* | (2006.01) | |
| *D03D 23/00* | (2006.01) | |
| *D03D 43/00* | (2006.01) | |
| *C06C 9/00* | (2006.01) | |
| *F02K 9/95* | (2006.01) | |
| *F02K 9/68* | (2006.01) | |
| *C06D 5/08* | (2006.01) | |

(52) U.S. Cl.
CPC ... *C06C 9/00* (2013.01); *C06D 5/08* (2013.01); *F02K 9/68* (2013.01); *F02K 9/95* (2013.01)

(58) Field of Classification Search
USPC ............ 149/45, 1, 75, 82, 108.6, 109.6
See application file for complete search history.

(56) References Cited

U.S. PATENT DOCUMENTS

| | | | | | |
|---|---|---|---|---|---|
| 5,118,281 | A | * | 6/1992 | Bramlette | ............ F23C 15/00 431/1 |
| 6,013,143 | A | * | 1/2000 | Thompson | ............ C06B 47/02 149/1 |
| 6,647,888 | B1 | * | 11/2003 | Cesaroni | ............ C06B 45/18 102/289 |

* cited by examiner

*Primary Examiner* — James McDonough
(74) *Attorney, Agent, or Firm* — Proskauer Rose LLP

(57) ABSTRACT

A catalyst free method of igniting an ionic liquid is provided. The method can include mixing a liquid hypergol with a HAN-based ionic liquid to ignite the HAN-based ionic liquid in the absence of a catalyst. The HAN-based ionic liquid and the liquid hypergol can be injected into a combustion chamber. The HAN-based ionic liquid and the liquid hypergol can impinge upon a stagnation plate positioned at top portion of the combustion chamber.

43 Claims, 22 Drawing Sheets

FAST IGNITION AND SUSTAINED COMBUSTION OF IONIC LIQUIDS

CROSS REFERENCE TO RELATED APPLICATIONS

This application claims the benefit of and priority to U.S. Provisional Patent Application No. 61/547,515, filed Oct. 14, 2011, which is owned by the assignee of interest and the entire disclosure of which is incorporated herein by reference.

GOVERNMENT RIGHTS

The invention was made with government support from the U.S. Air Force under contract nos. F33615-03-M-2377 and FA8650-04-C-2484, the U.S. Army under contract nos. W911NF-08-C-0078 and W911NF-09-C-0102, and NASA under contract no. NNX110E21P. The government may have certain rights in the invention.

FIELD OF THE INVENTION

The invention generally relates to ignition and combustion of ionic liquids, and more particularly, to systems and methods for fast ignition and sustained combustion of ionic liquids.

BACKGROUND OF THE INVENTION

The performance of current spacecraft propulsion systems can be limited, for example, by the low density specific impulse product of the propellants used. Furthermore, these propellants can be highly toxic (e.g., hydrazine, nitrogen tetroxide) and/or require special storage and handling (e.g., cryogens), which can complicate ground and in-space operations. Both monopropellant and bipropellant systems are currently in use for in-space propulsion. Typically, bipropellant systems (e.g., monomethyl hydrazine and nitrogen tetroxide) are heavier and more complex than monopropellant (e.g., hydrazine) systems.

New monopropellants, particularly a class of ionic liquids, are being developed to address the above problems with the current propellants. These ionic liquids can have high density, high specific impulse (hence high density - specific impulse product), and extremely low vapor pressure that can result in reduced toxicity. They can have a very low freezing point and decompose at high temperature without vaporization. This wide liquidus range makes ionic liquid propellants attractive for space use.

While ionic liquid propellants can offer superior propulsive performance, simplicity and lighter weight of a monopropellant system, and ease of storage and handling due to reduced toxicity, these propellants can be very difficult to ignite. This is true of most ionic propellants because of their extremely low vapor pressure. Unlike conventional propellants, the ionic propellants typically do not vaporize to any significant degree, which is required for ignition. Accordingly, conventional approaches currently being developed use a catalyst that is heated (typically, the 405 catalyst manufactured by Honeywell, Columbus, Ohio, now Aerojet Corp., Sacramento, Calif.) to initiate ignition. However, the heated catalytic ignition has some drawbacks. The catalyst needs to be heated to high temperatures (approximately 300° C.); there can be issues with the catalysts structural stability at these temperatures, and its effectiveness can diminish rather quickly (e.g., minutes) due to cumulative poisoning. The catalyst can also be subject to thermal shock with each ignition cycle, which contributes to a reduction in the catalyst's longevity. Thus, catalytic ignition can limit the operational lifetime of propulsion systems, lowers system reliability, and requires significant power for its operation.

For applications such as aircraft EPUs, which require only a few minutes of operation, the use of catalyst can be appropriate. One problem in an EPU system is that it can be difficult to get the catalyst heated to a desired temperature (e.g., a temperature sufficient for ignition) rapidly (approximately 250 ms).

Therefore, it can be desirable to ignite fuel rapidly. It can also be desirable to ignite fuel without the use of a catalyst.

SUMMARY OF THE INVENTION

Advantages of the invention include providing a green, high performance, storable ionic liquid monopropellant for space propulsion and space and non-space power systems. Other advantages include providing a fast, catalyst-free, long-life and inexpensive ignition system for ionic monopropellants. Other advantages include a light-weight, long-life, space propulsion system. Liquid monopropellant gas generators can pressurize gelled propellants both in space and on ground. Hydrazine in space propulsion systems can be replaced. Other advantages include use of the invention with the current state-of-the-art catalysts in systems with less stringent requirements on startup time and operating life than space applications, such as aircraft Emergency Power Units (EPUs).

In one aspect, the invention involves a catalyst free method of igniting an ionic liquid. The method involves mixing a liquid hypergol with a HAN-based ionic liquid to ignite the HAN-based ionic liquid in the absence of a catalyst.

In some embodiments, the method involves injecting the HAN-based ionic liquid and the liquid hypergol into a combustion chamber. In some embodiments, the HAN-based ionic liquid and the liquid hypergol impinge upon a stagnation plate positioned at top portion of the combustion chamber. In some embodiments, the stagnation plate comprises a wire mesh, a foam, a perforated plate, a solid plate, or any combination thereof.

In some embodiments, a flow path of the HAN-based ionic liquid and the liquid hypergol within the combustion chamber is perpendicular to a top surface of the stagnation plate. In some embodiments, the method also includes discontinuing the injection of the liquid hypergol such that the stagnation plate thermally maintains the ignition the HAN-based ionic liquid.

In some embodiments, the method also involves injecting the liquid hypergol into the combustion chamber to reignite the HAN-based ionic liquid if the stagnation plate fails to thermally maintain the ignition of the HAN-based ionic liquid. In some embodiments, a flow path of the HAN-based ionic liquid and the liquid hypergol into the combustion chamber is transverse to a top surface of the combustion chamber.

In some embodiments, a flow path of the HAN-based ionic liquid and the liquid hypergol into the combustion chamber is perpendicular to a top surface of the stagnation plate. In some embodiments, the hypergol includes a compound selected from the group consisting of:

Nitronium, nitrosonium salts, Hypohalite compounds, heavy metals and their salts, $NO_2BF_4$, $NOBF_4$, $NO_2ClO_4$, $NO_2ClF_4$, $I_2O_5$, $I_2O_6$, $I_2O_7$, HOCl, HOBr, HOI, [NaO-Cl.NaOH], Fe, Cu, powdered Zn, $Fe(NO_3)_3$, $FeCl_3$, $MnO_2$ and $KMnO_4$.

In some embodiments, the stagnation plate comprises a metal, a non-metal, a ceramic, or any combination thereof. In some embodiments, a mass flow ratio of the hypergol to the propellant injected into the combustion chamber ranges between 0 and 1. In some embodiments, the HAN-based ionic liquid includes a fuel component. In some embodiments, the HAN-based ionic liquid includes a fuel component and water in a ratio of about 64:8:28.

In some embodiments, the HAN-based ionic liquid includes AF-M315E monopropellant. In some embodiments, the liquid hypergol includes an aqueous solution of iodine pentoxide. In some embodiments, the method involves pressurizing the combustion chamber to at least 500 psi. In some embodiments, the fuel component includes triethenolammonium nitrate (TEAN) or tris(amoniethyl)amine trinitrate (TREN3).

In some embodiments, the liquid hypergol is a 50-50 wt % solution of iodine pentoxide and water. In some embodiments, the fuel component includes triethenolammonium nitrate (TEAN) or tris(amoniethyl)amine trinitrate (TREN3).

In another aspect, the invention involves a method of igniting and sustaining combustion of a monopropellant. The method involves providing a plurality of catalyst granules in a combustion chamber, the catalyst granules being coated with a hypergol. The method also involves injecting a monopropellant into the combustion chamber such that the monopropellant is hypergolically ignited.

In some embodiments, the method involves providing an aqueous solution including the hypergol. In some embodiments, the method involves evaporating the aqueous solution such that the catalyst granules are coated with the hypergol. In some embodiments, the method involves admixing the hypergol with the plurality of catalyst granules.

In some embodiments, the catalyst granules include an iridium-based catalyst. In some embodiments, the monopropellant includes the AF-M315E monopropellant. In some embodiments, the hypergolic ignition of the monopropellant heats the catalyst granules to a temperature at which the monopropellant thermally decomposes. In some embodiments, the monopropellant includes a HAN-based ionic liquid.

In some embodiments, the hypergol includes a compound selected from the group consisting of: Nitronium, nitrosonium salts, Hypohalite compounds, heavy metals and their salts, $NO_2BF_4$, $NOBF_4$, $NO_2ClO_4$, $NO_2ClF_4$, $I_2O_5$, $I_2O_6$, $I_2O_7$, HOCl, HOBr, HOI, [NaOCl.NaOH], Fe, Cu, powdered Zn, $Fe(NO_3)_3$, $FeCl_3$, $MnO_2$ and $KMnO_4$. In some embodiments, the method involves following the heating of the catalyst granules, sustaining thermal decomposition of the monopropellant for a predetermined time period.

In some embodiments, the monopropellant thermally decomposes over the catalyst granules. In some embodiments, the catalyst granules are heated to a temperature at or above 200° C. In some embodiments, the hypergol includes iodine pentoxide. In some embodiments, the method also involves heating the catalyst granules to a temperature at which the monopropellant thermally decomposes.

In some embodiments, the hypergol is a powder. In some embodiments, the HAN-based ionic liquid includes a fuel component. In some embodiments, the HAN-based ionic liquid includes a fuel component and water in a ratio of about 64:8:28. In some embodiments, the fuel component includes triethenolammonium nitrate (TEAN) or tris(amoniethyl)amine trinitrate (TREN3). In some embodiments, the fuel component includes triethenolammonium nitrate (TEAN) or tris(amoniethyl)amine trinitrate (TREN3).

In yet another aspect, the invention includes a combustor for hypergolically igniting an ionic liquid. The combustor includes a combustion chamber. The combustor also includes a catalyst bed disposed within the combustion chamber, the catalyst bed including a plurality of catalyst granules coated or admixed with a hypergol.

In some embodiments, the catalyst granules include an iridium-based catalyst. In some embodiments, the hypergol includes iodine pentoxide. In some embodiments, the hypergol includes a compound selected from the group consisting of: Nitronium, nitrosonium salts, Hypohalite compounds, heavy metals and their salts, $NO_2BF_4$, $NOBF_4$, $NO_2ClO_4$, $NO_2ClF_4$, $I_2O_5$, $I_2O_6$, $I_2O_7$, HOCl, HOBr, HOI, [NaOCl.NaOH], Fe, Cu, powdered Zn, $Fe(NO_3)_3$, $FeCl_3$, $MnO_2$ and $KMnO_4$.

In some embodiments, the combustion chamber defines a monopropellant inlet orifice at a proximal end of the combustion chamber and an outlet orifice at a distal end of the combustion chamber. In some embodiments, the outlet orifice includes a nozzle, the nozzle is coupled to a power turbine. In some embodiments, the outlet orifice includes a nozzle constructed and arranged to produce a thrust. In some embodiments, the catalyst granules are heated to a temperature at or above 200° C. In some embodiments, the hypergol is a powder.

In some embodiments, the invention includes a precombustor for hypergolically igniting an ionic liquid, followed by further combustion with addition of ionic liquid into a main combustion chamber.

In yet another aspect, the invention includes a combustor for hypergolically igniting an ionic liquid. The combustor includes a combustion chamber. The combustor also includes a propellant injector at a proximal end of the combustion chamber, the propellant injector coupled to a supply of ionic liquid. The combustor also includes a hypergol injector at the proximal end of the combustion chamber, the hypergol injector coupled to a supply of liquid hypergol. The combustor also includes a stagnation plate positioned within the combustion chamber.

In some embodiments, the combustor includes a precombustion chamber coupled to the combustion chamber, the precombustion chamber separates the combustion chamber from the propellant inlet and the hypergol injector. In some embodiments, the stagnation plate is positioned between the precombustion chamber and the combustion chamber.

In some embodiments, the propellant injector and the hypergol injector are configured to direct a flow of the ionic liquid and the liquid hypergol toward a surface of the stagnation plate. In some embodiments, the propellant injector and the hypergol injector are configured such that a flow path of the ionic liquid and the liquid hypergol is perpendicular to a top surface of the stagnation plate.

In some embodiments, the stagnation plate is configured to promote mixing of the ionic liquid and the liquid hypergol. In some embodiments, the supply of ionic liquid includes a supply of a HAN-based ionic liquid. In some embodiments, the supply of liquid hypergol includes a supply of iodine pentoxide. In some embodiments, the hypergol includes a compound selected from the group consisting of: Nitronium, nitrosonium salts, Hypohalite compounds, heavy metals and their salts, $NO_2BF_4$, $NOBF_4$, $NO_2ClO_4$, $NO_2ClF_4$, $I_2O_5$, $I_2O_6$, $I_2O_7$, HOCl, HOBr, HOI, [NaOCl.NaOH], Fe, Cu, powdered Zn, $Fe(NO_3)_3$, $FeCl_3$, $MnO_2$ and $KMnO_4$.

In some embodiments, the stagnation plate comprises a wire mesh, a foam, a perforated plate, a solid plate, or any combination thereof In some embodiments, the stagnation plate comprises a metal, a non-metal, a ceramic, or any combination thereof. In some embodiments, the mass flow ratio of the hypergol to the propellant injected into the combustion chamber or the combustion chamber ranges between 0 and 0.5.

In some embodiments, the ionic liquid includes a fuel component. In some embodiments, the ionic liquid includes a fuel component and water in a ratio of about 64:8:28.

In some embodiments, the combustion chamber is pressurized to at least 700 psi. In some embodiments, the ionic liquid includes triethenolammonium nitrate (TEAN) or tris(amoniethyl)amine trinitrate (TREN3). In some embodiments, the liquid hypergol is a 50-50 wt % solution of iodine pentoxide and water. In some embodiments, the ionic liquid includes triethenolammonium nitrate (TEAN) or tris(amoniethyl) amine trinitrate (TREN3).

In another aspect, the invention includes an emergency power unit. The emergency power unit includes a turbine. The emergency power unit also includes a combustion chamber coupled to the turbine. The emergency power unit also includes a fuel control system configured to inject a HAN-based fuel and a liquid hypergol into the combustion chamber to hypergolically ignite the HAN-based fuel.

In some embodiments, the liquid hypergol includes iodine pentoxide. In some embodiments, the hypergol includes a compound selected from the group consisting of: Nitronium, nitrosonium salts, Hypohalite compounds, heavy metals and their salts, $NO_2BF_4$, $NOBF_4$, $NO_2ClO_4$, $NO_2ClF_4$, $I_2O_5$, $I_2O_6$, $I_2O_7$, HOCl, HOBr, HOI, [NaOCl.NaOH], Fe, Cu, powdered Zn, $Fe(NO_3)_3$, $FeCl_3$, $MnO_2$ and $KMnO_4$. In some embodiments, a mass flow ratio of the hypergol to the propellant injected into the combustion chamber is zero. In some embodiments, a mass flow ratio of the hypergol to the propellant injected into the combustion chamber ranges between 0 and 0.5.

In some embodiments, the combustion chamber includes a catalyst bed disposed within the combustion chamber. In some embodiments, the catalyst bed includes a plurality of catalyst granules, the catalyst bed configured to promote thermal decomposition of the HAN-based fuel. In some embodiments, the catalyst granules include an iridium-based catalyst. In some embodiments, the HAN-based fuel includes AF-M315E monopropellant. In some embodiments, the liquid hypergol includes an aqueous solution of iodine pentoxide. In some embodiments, the combustion chamber is pressurized to at least 700 psi. In some embodiments, the HAN-based fuel includes triethenolammonium nitrate (TEAN) or tris(amoniethyl)amine trinitrate (TREN3). In some embodiments, the liquid hypergol is a 50-50 wt % solution of iodine pentoxide and water.

In yet another aspect, the invention includes an emergency power unit. The emergency power unit includes a turbine. The emergency power unit also includes a combustion chamber coupled to the turbine. The emergency power unit also includes a catalyst bed disposed within the combustion chamber, the catalyst bed including a plurality of catalyst granules coated or admixed with a hypergol. The emergency power unit also includes a fuel control system configured to inject a HAN-based fuel into the combustion chamber to hypergolically ignite the HAN-based fuel.

In some embodiments, the catalyst bed is configured to promote thermal decomposition of the HAN-based fuel. In some embodiments, the catalyst granules include an iridium-based catalyst. In some embodiments, the hypergol includes iodine pentoxide.

In some embodiments, the hypergol includes a compound selected from the group consisting of: Nitronium, nitrosonium salts, Hypohalite compounds, heavy metals and their salts, $NO_2BF_4$, $NOBF_4$, $NO_2ClO_4$, $NO_2ClF_4$, $I_2O_5$, $I_2O_6$, $I_2O_7$, HOCl, HOBr, HOI, [NaOCl.NaOH], Fe, Cu, powdered Zn, $Fe(NO_3)_3$, $FeCl_3$, $MnO_2$ and $KMnO_4$. In some embodiments, the HAN-based fuel includes the AF-M315E monopropellant.

In some embodiments, the HAN-based fuel undergoes sustained ignition for a predetermined time. In some embodiments, the HAN-based fuel thermally decomposes over the catalyst granules. In some embodiments, the catalyst granules are heated to a temperature at or above 200° C. In some embodiments, the hypergol is a powder. In some embodiments, the HAN-based fuel includes a fuel component and water in a ratio of about 64:8:28. In some embodiments, the HAN-based fuel includes triethenolammonium nitrate (TEAN) or tris(amoniethyl)amine trinitrate (TREN3).

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
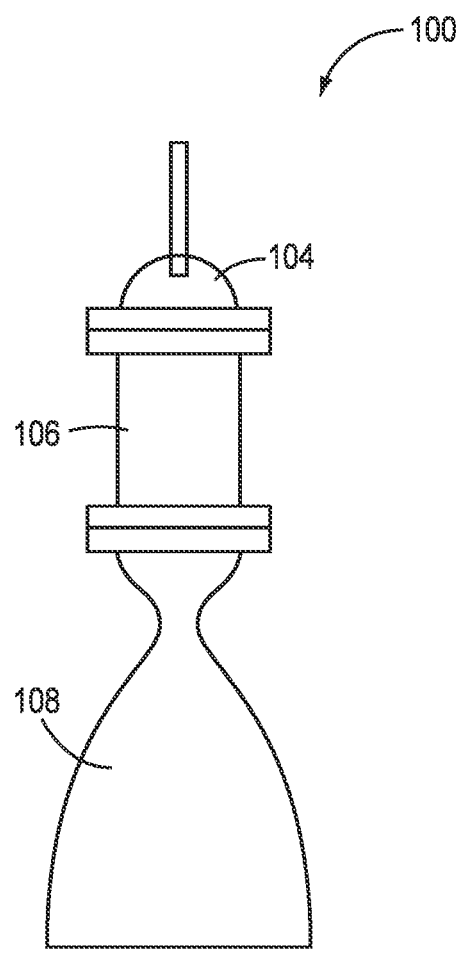
FIG. 1 is a diagram of a rocket engine with a combustion chamber and an upper portion, according to an illustrative embodiment of the invention.

In general, the invention involves igniting a fuel with a hypergol. The hypergol can ignite the fuel when the hypergol and the fuel are in fluid communication for a predetermined duration. In some embodiments, the hypergol and fuel are injected into a combustion chamber such that they impinge on a stagnation plate within the combustion chamber, which can cause the hypergol and fuel to be in fluid communication for the predetermined duration. In some embodiments, the hypergol and fuel are each injected into the combustion chamber at an angle which ensures that they will be in fluid communication for the predetermined duration.

Hypergol compounds (oxides of iodine such as $I_2O_5$ or $I_2O_6$) can rapidly (e.g., as low as 25 ms) ignite ionic liquids. For example, HAN-based AF-M315E propellant can ignite ionic liquids in 25 to 250 ms. The time it takes for ignition (e.g., ignition delay) can depend upon how quickly the propellant and the hypergol mix upon coming into contact and the chamber pressure. For example, for a hypergol that is a solid powder the ignition delay is approximately 250 ms, for a hypergol that is slurried with water, the ignition delay is approximately 40 ms at 1000 psi, and for a hypergol that is a concentrated solution in water, the ignition delay is approximately 50 ms at 1000 psi. The ignition delay can also depend on the combustion chamber pressure. For example, at combustion chamber pressures typical of a gas generator system of approximately 2000 to 2500 psi, the ignition delay can be as low as 25 ms. Hypergolic ignition can occur at combustion chamber pressures from 300 psi and above. For a sustained combustion of a stand (column) of AF-M315E following $I_2O_5$-initiated ignition can occur at a combustion chamber greater than 600 psi.

In general, the invention also involves igniting a fuel using coated catalyst granules. Catalyst granules coated with a hypergol can ignite a fuel when the hypergol coated catalyst granules and the fuel are in contact for a predetermined duration. The predetermined duration can be based on an ignition delay time. In some embodiments, the hypergol coated catalyst granules are placed into a combustion chamber. The fuel can then be injected into the combustion chamber containing the hypergol coated catalyst granules. Upon contacting the fuel for a predetermined duration, the hypergol ignites the fuel and the catalyst is heated. After a predetermined duration, the catalyst is heated to a temperature such that the catalyst can maintain ignition of the fuel, even after the hypergol is depleted.

The invention also involves igniting a fuel with a hypergol in an emergency power unit to, for example, provide emergency power for an aircraft upon power failure. Upon a power failure, a hypergol (or hypergol coated catalyst granules) and fuel are combusted in a combustion chamber that is coupled to a turbine. Combustion gases from the combustion chamber are directed to the turbine to produce a mechanical movement within the turbine. The turbine is mechanically coupled to a gearbox which in turn drives a hydraulic pump and an electrical generator. In some embodiments the combustion is achieved by injecting liquid hypergol and fuel into the combustion chamber. In some embodiments the combustion is achieved by coating catalyst granules with hypergol and placing them in the combustion chamber and at a later time, injecting a fuel to achieve combustion.

Figure 2A:
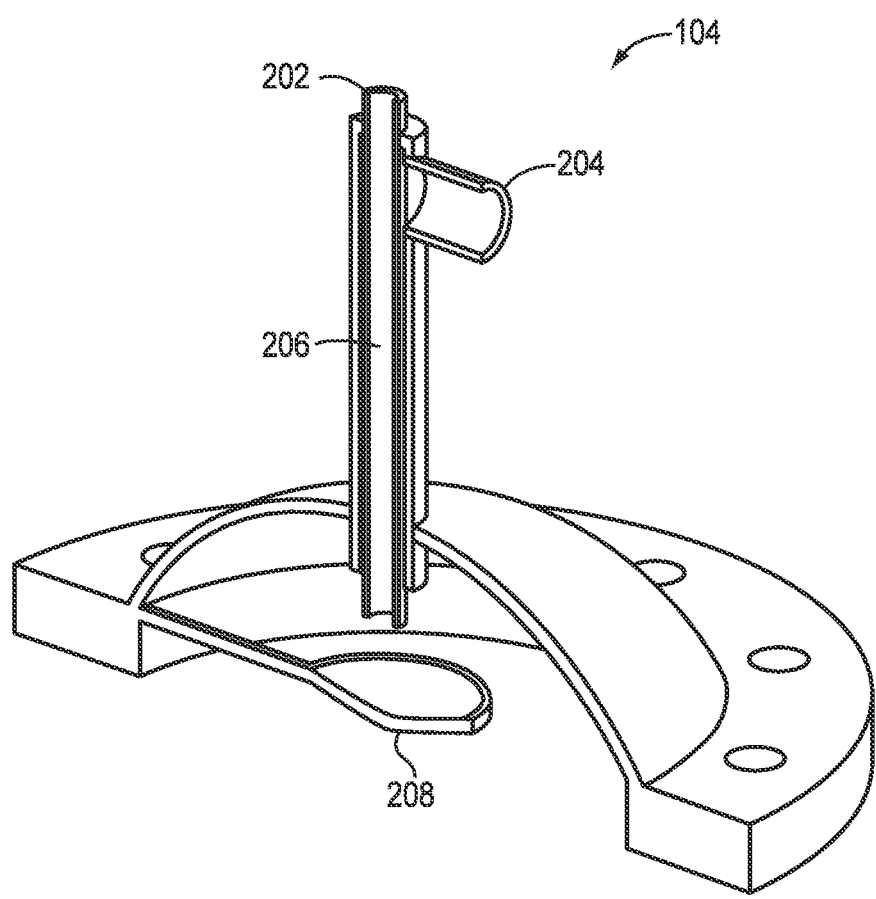
FIG. 2A is a diagram of an upper portion of a rocket engine, according to an illustrative embodiment of the invention.

FIG. 1 is a diagram of a rocket engine 100 in accordance with an illustrative embodiment of the present invention. The rocket engine 100 includes an upper portion 104 that houses the injection and ignition assemblies, a combustion chamber 106, and a rocket nozzle 108. The upper portion 104 includes a monopropellant (e.g., fuel) inlet 202, and a hypergol inlet 204 (FIG. 2A). During operation a monopropellant is inserted into the combustion chamber 106 via monopropellant inlet 202. A hypergol is inserted into the combustion chamber via a hypergol inlet 204. When the monopropellant and the hypergol are in fluid communication within the combustion chamber 106 for a predetermined duration, the hypergol ignites the monopropellant producing a flame and the flame enters the rocket nozzle 108.

In some embodiments, the monopropellant is hydroxylammonium nitrate (HAN), triethenolammonium nitrate (TEAN), tris(amoniethyl)amine trinitrate (TREN3), or AF-M315E. In some embodiments, the hypergol is iodine pentoxide, nitronium, or hypohalite compounds.

FIG. 2A is a diagram of an expanded view of the upper portion 104, according to an illustrative embodiment of the invention. The upper portion 104 includes the monopropellant inlet 202 and the hypergol inlet 204, as described above in FIG. 1. The upper portion 104 also includes a common flow path 206 and a stagnation plate 208.

During operation, a hypergol and a monopropellant are injected into the upper portion 104 via the hypergol inlet 204 and monopropellant inlet 202, respectively. Once the hypergol and the monopropellant are injected into the upper portion they mix within and travel through the common flow path 206 at a flow rate towards the combustion chamber 106. Upon entering the combustion chamber 106 the mixture of the monopropellant and hypergol impinge upon the stagnation plate 208.

Once the mixture of the monopropellant and hypergol impinges on the stagnation plate 208, the stagnation plate 208 can slow down the flow rate of the mixture of the monopropellant and the hypergol such that the time that the monopropellant spends in contact with the hypergol is increased. This can enhance the efficiency of the hypergolic ignition process. In some embodiments, the geometry of the common flow path 206 can be chosen such that the hypergol-monopropellant mixture that exits the common flow path 206 is composed of fine droplets. In some embodiments, the monopropellant and the hypergol do not mix while inside of the common flow path 206 such that the monopropellant and the hypergol exit the common flow path 206 as co-flowing jets. In some embodiments the monopropellant and the hypergol do not mix while inside of the common flow path 206 such that the monopropellant and the hypergol exit the common flow path 206 in sheets of liquid. In various embodiments, the geometry of the common flow path is two co-flowing streams, two impinging counter-flowing streams, two co-flowing liquid sheets, two liquid sprays impinging at an angle, or other similar configurations. In some embodiments, the mixture of monopropellant and hypergol impinges upon the stagnation plate 208 at a substantially normal angle of incidence. In some embodiments, the mixture of monopropellant and hypergol impinges upon the stagnation plate 208 with an angle of incidence of approximately 45 degrees.

In some embodiments the stagnation plate 208 is made of silicon carbide foam, perforated metal disks, a wire mesh, or a combination thereof. In some embodiments, the stagnation plate 208 has a hole drilled through a central region thereof.

In some embodiments, the hypergol is nitronium, nitrosonium salts, hypohalite compounds, heavy metals and their salts, $NO_2BF_4$, $NOBF_4$, $NO_2ClO_4$, $NO_2ClF_4$, $I_2O_5$, HOCl, HOBr, HOI, [NaOCl.NaOH], Fe, Cu, powdered Zn, $Fe(NO_3)_3$, $FeCl_3$, $MnO_2$ or $KMnO_4$. In some embodiments, the monopropellant is hydroxylammonium nitrate (HAN), triethenolammonium nitrate (TEAN), tris(amoniethyl)amine trinitrate (TREN3), or AF-M315E.

Figure 2B:
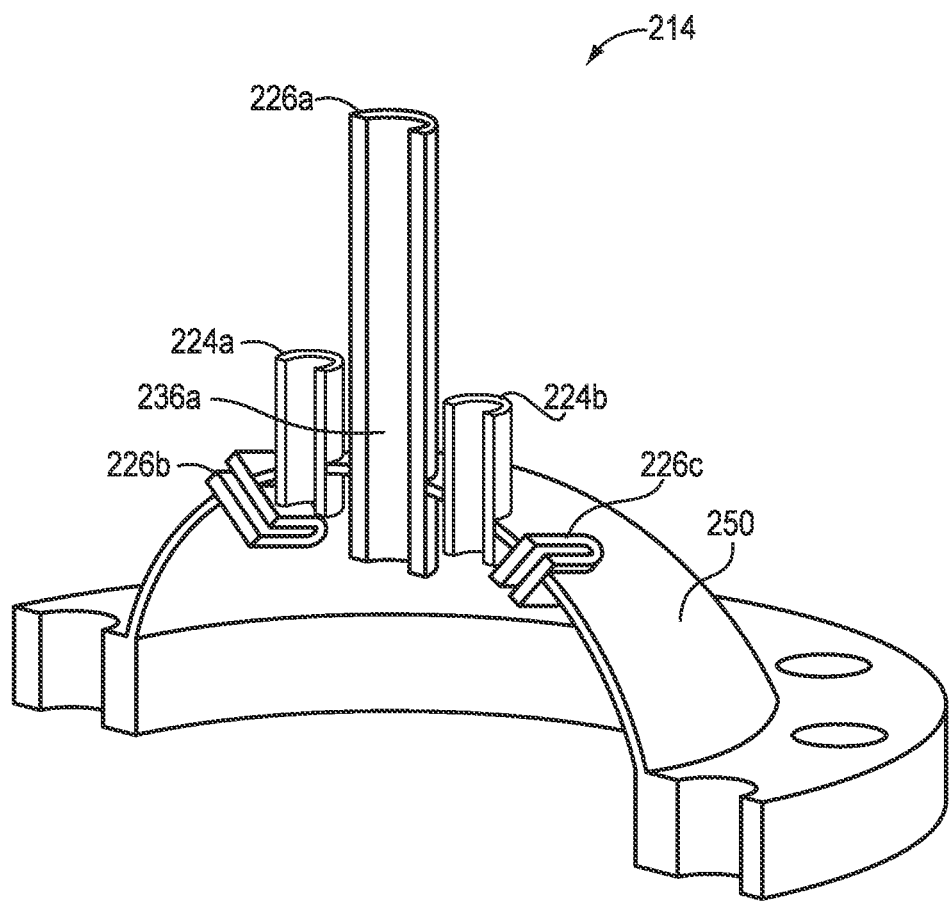
FIG. 2B is a diagram of an upper portion of a rocket engine, according to an illustrative embodiment of the invention.
Figure 2C:
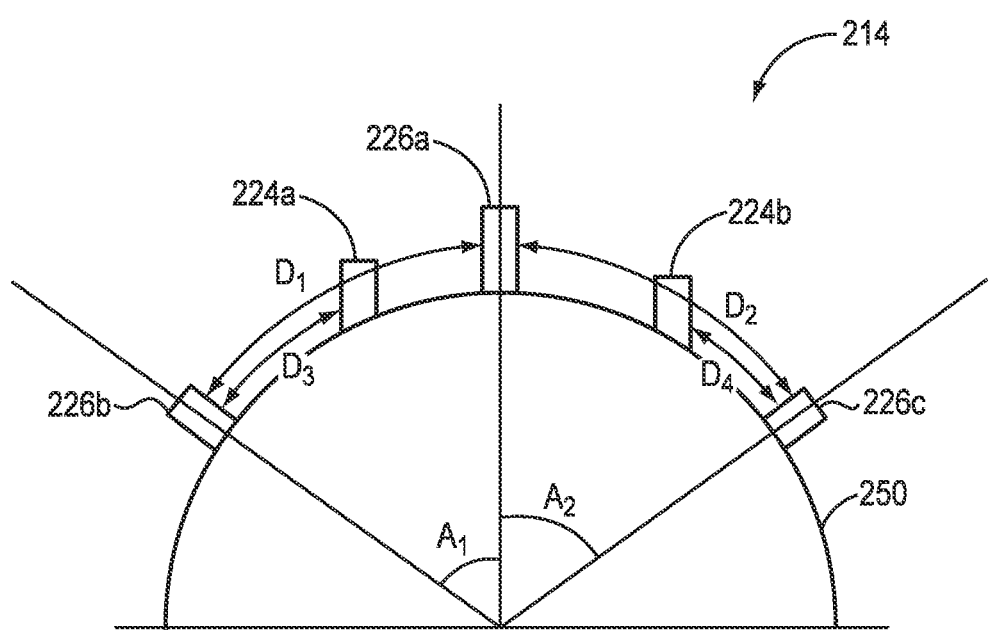
FIG. 2C is a diagram of an upper portion of a rocket engine, according to an illustrative embodiment of the invention.

Turning back to FIG. 1, the upper portion 104 can have multiple hypergol and/or monopropellant inlets and various configurations. For example, FIG. 2B and FIG. 2C are diagrams of an expanded view of the upper portion 214 (e.g., upper portion 104, as described above in FIG. 1) of a rocket engine (e.g., rocket engine 100, as described above in FIG. 1), according to an illustrative embodiment of the invention. More specifically, FIG. 2B shows a three dimensional cross sectional view of the upper portion 214 and FIG. 2C shows a two dimensional cross sectional view of the upper portion 214. The upper portion 214 includes a first monopropellant inlet 226a, a second monopropellant inlet 226b, and a third monopropellant inlet 226c, generally 226, and a first hypergol inlet 224a and a second hypergol inlet 224b, generally 224.

During operation, a monopropellant and a liquid hypergol are injected into the upper portion 104 via the monopropellant inlets 226 and the hypergol inlets 224, respectively. After the hypergol and monopropellant are injected into the upper portion 104 they travel along separate flow paths within each of the monopropellant inlets 226 and the hypergol inlets 224 at a flow rate towards the combustion chamber 106. Upon entering the combustion chamber 106, the separate flow paths intersect within the combustion chamber 106 such that the hypergol and monopropellant come into contact for a predetermined duration such that the hypergol ignites the monopropellant.

In some embodiments, the upper portion 104 includes a top portion 250. The top portion 250 can be in the shape of a hemisphere. The first monopropellant inlet 226a can be positioned at a first location 236a on the top portion 250. The first location 236a can be on a central axis of the hemisphere. The second monopropellant inlet 226b can be positioned at a distance D1 along the hemisphere from the first monopropellant inlet 226a. The third monopropellant inlet 226c can be positioned at a distance D2 along the hemisphere from the first monopropellant inlet 226a. The first hypergol inlet 224a can be positioned at a distance D3 from the second monopropellant inlet 226b. The second hypergol inlet 226b can be positioned at a distance D4 from the third monopropellant inlet 226c. The second monopropellant inlet 226b can be positioned at a first angle A1 with respect to the first monopropellant inlet 226a. The third monopropellant inlet 226c can be positioned at a second angle A2 with respect to the first monopropellant inlet 226a.

In some embodiments, the distances, D1-D4 are chosen according a desired radius of the hemisphere. In some embodiments, the desired radius of the hemisphere is based on a desired thrust. In some embodiments, the distance D1 is approximately 12 inches. In some embodiments, the distance D2 is approximately 12 inches. In some embodiments, the distance D3 is approximately 12 inches. In some embodiments, the distance D4 is approximately 12 inches. In some embodiments, the first angle A1 is 45 degrees. In some embodiments, the second angle A2 is 45 degrees. The geometry and configuration of the inlets can be chosen such that after the monopropellant and hypergol come into contact in the upper portion 104 of the rocket engine 100, they remain in contact for a sufficient time to achieve sustained ignition of the monopropellant.

In some embodiments, the geometry of the flow paths can be chosen such that the liquid exiting the various flow paths is composed of fine droplets. In various embodiments, the geometry of the common flow path is atomized sprays of liquid hypergol solution and HAN based liquid monopropellant intersecting angles from 45 degrees to 90 degrees. In various embodiments, the geometry of the common flow path is two co-flowing streams, two impinging counter-flowing streams, two co-flowing liquid sheets, two liquid sprays impinging at an angle, or other similar configurations.

Figure 2D:
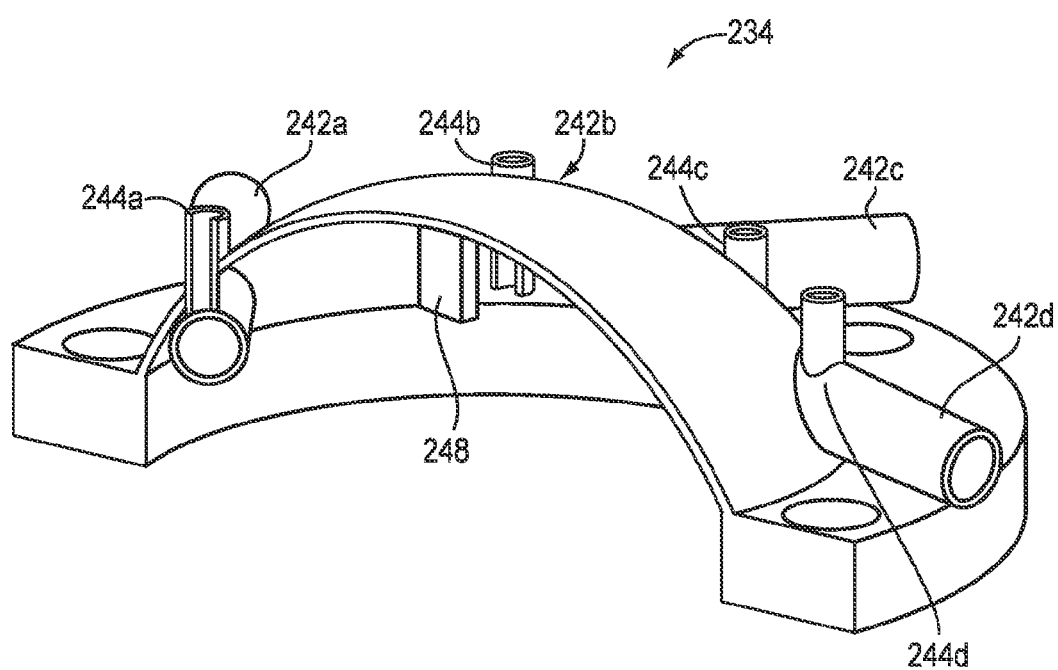
FIG. 2D is a diagram of an upper portion of a rocket engine, according to an illustrative embodiment of the invention.
Figure 2E:
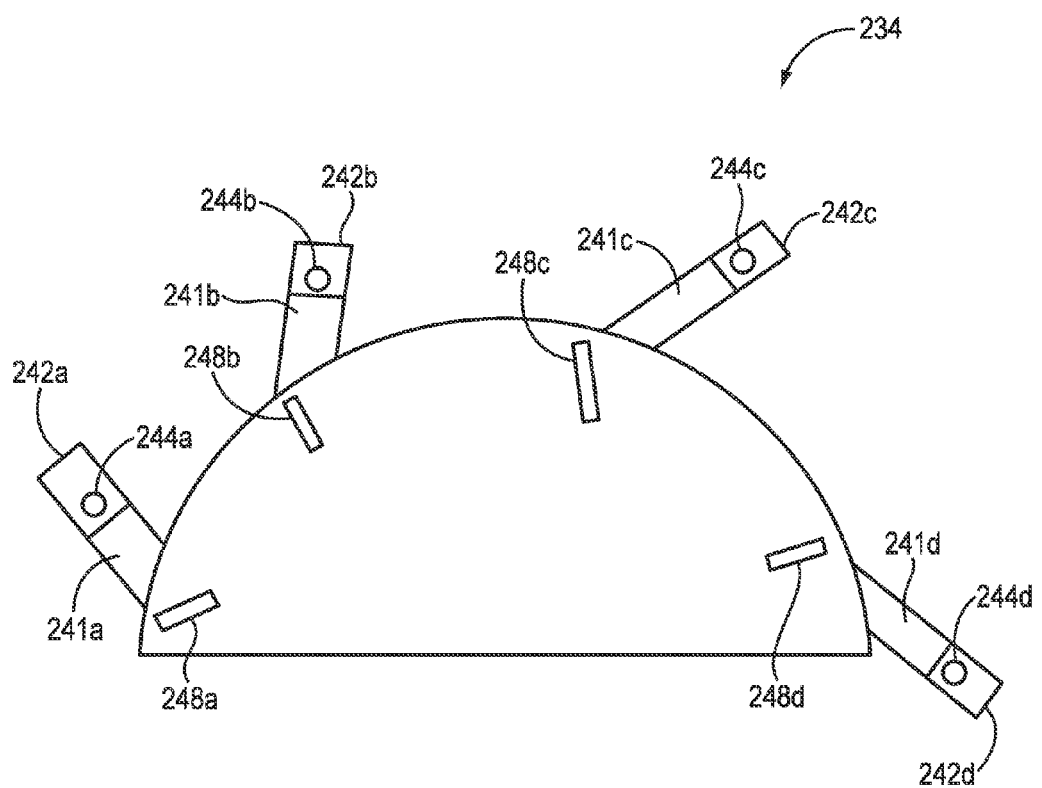
FIG. 2E is a diagram of an upper portion of a rocket engine, according to an illustrative embodiment of the invention.

Turning back to FIG. 1, the upper portion 104 can have various hypergol and/or monopropellant inlets and various configurations. FIG. 2D and FIG. 2E are diagrams of an upper portion 234 (e.g., upper portion 104, as described above in FIG. 1) of a rocket engine (e.g., rocket engine 100, as described above in FIG. 1), according to an illustrative embodiment of the invention. More specifically, FIG. 2D shows a three dimensional cross sectional view of the upper portion 234 and FIG. 2E shows a top down two dimensional view of the upper portion 234. The upper portion 234 includes a first monopropellant inlet 242a, a second monopropellant inlet 242b, a third monopropellant inlet 242c, and a fourth monopropellant inlet 242d, generally, monopropellant inlets 242. The upper portion 234 also includes a first hypergol inlet 244a, a second hypergol inlet 244b, a third hypergol inlet 244c, and a fourth hypergol inlet 244d, generally, hypergol inlets 244. The upper portion 234 also includes a first common flow path 241a, a second common flow path 241b, a third common flow path 241c, and a fourth common flow path 241d, generally, common flow paths 241. The upper portion 234 also includes a first stagnation plate 248a, a second stagnation plate 248b, a third stagnation plate 248c, and a fourth stagnation plate 248d, generally stagnation plates 248.

During operation, a hypergol and a monopropellant are injected into the upper portion 234 via the hypergol inlets 242 and monopropellant inlets 244, respectively. Once the hypergol and the monopropellant are injected into the upper portion 234 they mix within and travel through each of their respective common flow paths 241 at a flow rate. Upon entering the upper portion 234 through their respective common flow paths 241, each of the hypergol and monopropellant mixtures travel along an inner circumference of the upper portion 234 until they impinge upon a respective stagnation plate of the stagnation plates 248.

Once the mixture of the monopropellant and hypergol impinges on the stagnation plates 248, the stagnation plates 248 can slow down the flow rate of the mixture of the monopropellant and the hypergol such that the time that the monopropellant spends in contact with the hypergol is increased. In some embodiments, after impinging on the stagnation plates 248, the hypergol and monopropellant mixture moves in a swirling motion within the upper portion 234.

In some embodiments, the geometry of the common flow paths 241 can be chosen such that the hypergol-monopropellant mixture that exits the common flow paths 241 is composed of fine droplets. In some embodiments, the monopropellant and the hypergol do not mix while inside of the common flow paths 241 such that the monopropellant and the hypergol exit the common flow paths 241 as co-flowing jets. In some embodiments the monopropellant and the hypergol do not mix while inside of the common flow paths 241 such that the monopropellant and the hypergol exit the common flow paths 241 in sheets of liquid. In various embodiments, the geometry of the flow paths 241 are at right angles to each other. In various embodiments, the geometry of the common flow path is two co-flowing streams, two impinging counter-flowing streams, two co-flowing liquid sheets, two liquid sprays impinging at an angle, or other similar configurations.

In some embodiments, each mixture of monopropellant and hypergol exiting one of common flow paths 241 impinges upon one of the stagnation plates 248 at a substantially normal angle of incidence. In some embodiments, each mixture of monopropellant and hypergol exiting one of common flow paths 241 impinges upon one of the stagnation plates 248 with an angle of incidence of approximately 45 degrees.

In some embodiments the stagnation plates 248 are made of silicon carbide foam, a wire mesh, or a combination thereof. In some embodiments, the stagnation plates 248 have a hole drilled through a central region thereof.

Figure 3:
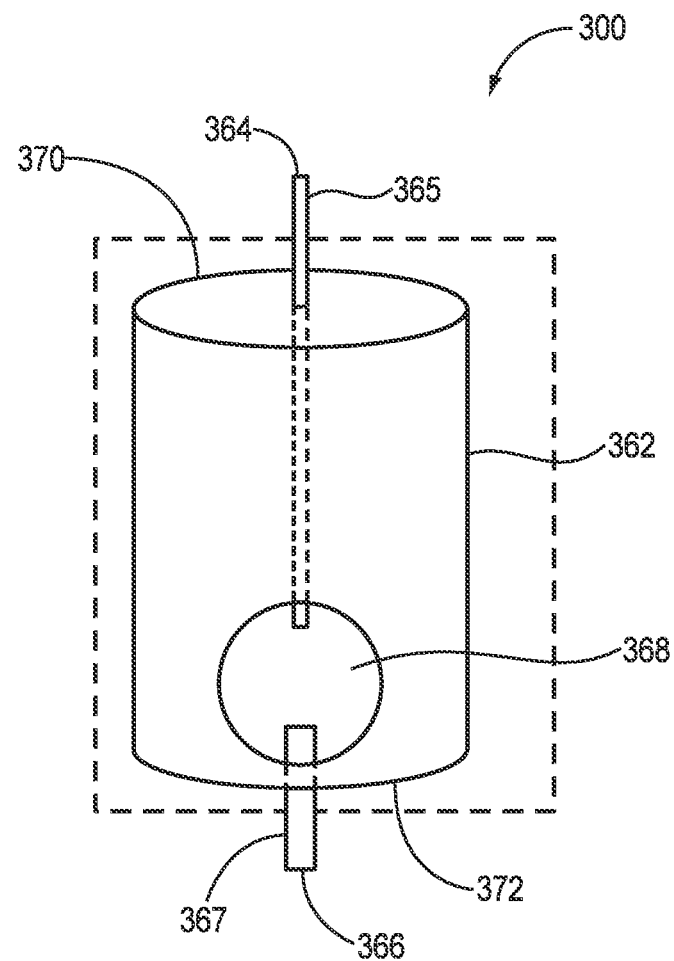
FIG. 3 is a diagram of a combustion chamber, according to an illustrative embodiment of the invention.

FIG. 3 is a diagram 300 of a combustion chamber 362, according to an illustrative embodiment of the invention. The combustion chamber 362 includes a liquid hypergol inlet 364 and a liquid hypergol flow path 365, at a first end 370 of the combustion chamber 362. The combustion chamber also includes a liquid monopropellant inlet 366 and a liquid monopropellant flow path 367 at a second end 372 of the combustion chamber 362.

The liquid hypergol inlet 364 and the liquid monopropellant inlet 366 are each in fluid communication with the combustion chamber 362 via the liquid hypergol flow path 365 and the liquid monopropellant flow path 367.

During operation, a monopropellant is inserted into the combustion chamber 362 via the monopropellant inlet 366. A liquid hypergol is inserted into the combustion chamber via the liquid hypergol inlet 364. The liquid hypergol and liquid monopropellant travel down their respective flow paths, namely the liquid hypergol flow path 365 and the liquid monopropellant flow path 367. The liquid hypergol flow path 365 and the liquid monopropellant flow path 367 are antiparallel and intersect at a central region 368 of the combustion chamber 362. The liquid monopropellant and the liquid hypergol come into contact in the central region 368 where the hypergolic ignition of the monopropellant occurs.

In some embodiments, a rocket nozzle (not shown) may be attached to the combustion chamber 362 to guide combustion gases to exit the combustion chamber 362. In some embodiments, a turbine is attached to the combustion chamber 362 and combustion gases can be used to drive the turbine to create a mechanical movement. The turbine can be used to drive an electrical generator or hydraulic pump.

Figure 4:
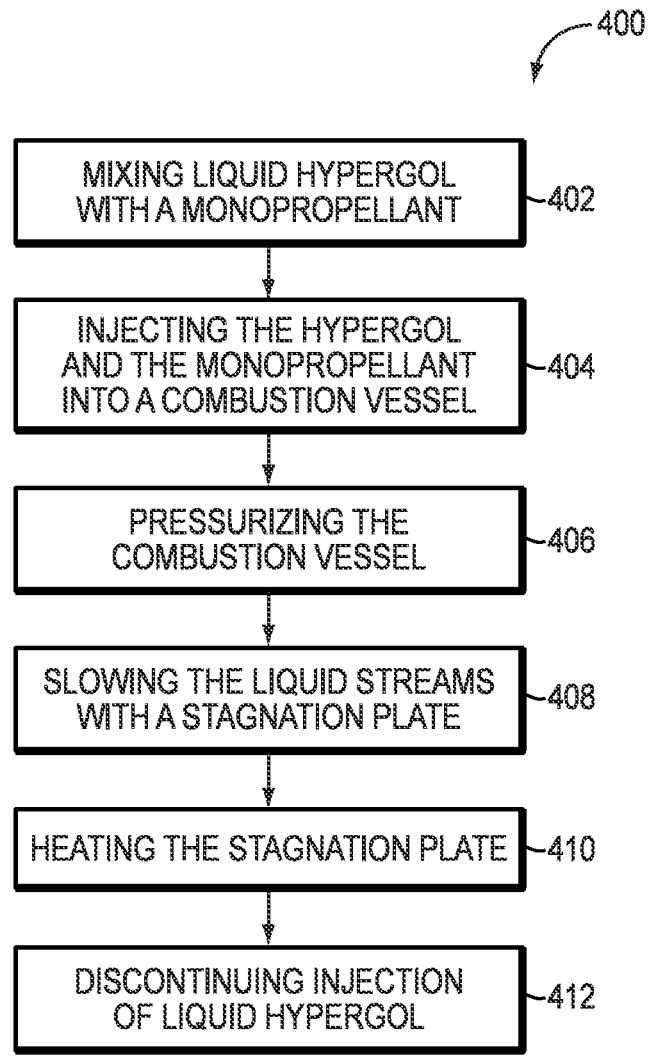
FIG. 4 is a flow diagram of a method for hypergolic ignition of a monopropellant in the absence of a catalyst, according to an illustrative embodiment of the invention.

FIG. 4 describes a catalyst free method 400 for igniting a monopropellant, according to an illustrative embodiment of the present invention.

The method includes, mixing a liquid hypergol with a monopropellant (Step 402). The liquid hypergol and the monopropellant can be mixed by, for example, injection into a common flow path (e.g., the common flow path 202 as is described above in FIG. 2A). In some embodiments, the liquid hypergol and monopropellant are injected in separate flow paths, with the mixing occurring at the intersection of the separate flow paths (e.g., the flow paths 224 and 226, as described above in FIG. 2B).

The method also includes, injecting the monopropellant and the liquid hypergol into a combustion vessel (Step 404). In some embodiments, the monopropellant and the liquid hypergol are injected at a flow rate needed to achieve a desired thrust. For example, for a small scale thruster, with less than 5 lbf thrust, the flow rates can be for example, less than 100 g/s of monopropellant and less than 25 g/s of aqueous hypergol solution. In some embodiments, the monopropellant and the liquid hypergol are injected along one or more flow paths (e.g., common flow path 206, as described above in FIG. 2A), into the combustion vessel (e.g., combustion vessel 106 as described above in FIG. 1). In some embodiments, the combustion chamber is pressurized (Step 406). Pressurizing the combustion chamber can cause a monopropellant ignited by a liquid hypergol to remain ignited. In some embodiments, the combustion chamber is pressurized to a pressure of at least 500 psi.

The method also includes, slowing a flow rate of each of the injected liquids (e.g., liquid hypergol and monopropellant) with a stagnation plate (e.g., the stagnation plate 208, as described above in FIG. 1) (Step 408). In some embodiments, the stagnation plate is placed in the flow path of the hypergol and monopropellant, for example, as described above in FIG. 2A and FIG. 2C. Slowing the injected liquids can cause the hypergol and monopropellant to remain in contact for a desired duration. The desired duration can be the duration that it takes the hypergol to ignite the monopropellant.

The method also includes, heating a stagnation plate (e.g., the stagnation plate 208, as described above in FIG. 2A) to a desired temperature (Step 410). The desired temperature can cause the stagnation plate to maintain thermal ignition of the monopropellant in the absence of the hypergol liquid.

The method also includes discontinuing the injection of the liquid hypergol (Step 412). The injection of the liquid hypergol can be discontinued after the stagnation plate reaches a temperature capable of maintaining thermal ignition of the monopropellant and the monopropellant has been ignited by the liquid hypergol. In some embodiments, after the liquid hypergol injection is discontinued, the ignition of the monopropellant is thermally maintained by the stagnation plate. In some embodiments, if the maintenance of the ignition by the stagnation plate fails the liquid hypergol can be injected again to reignite the monopropellant. Maintenance of the ignition can fail, for example, due to the pressure in the combustion chamber falling below a pressure required to maintain ignition, or the temperature of the stagnation plate falling below a temperature required to sustain ignition.

Figure 5A:
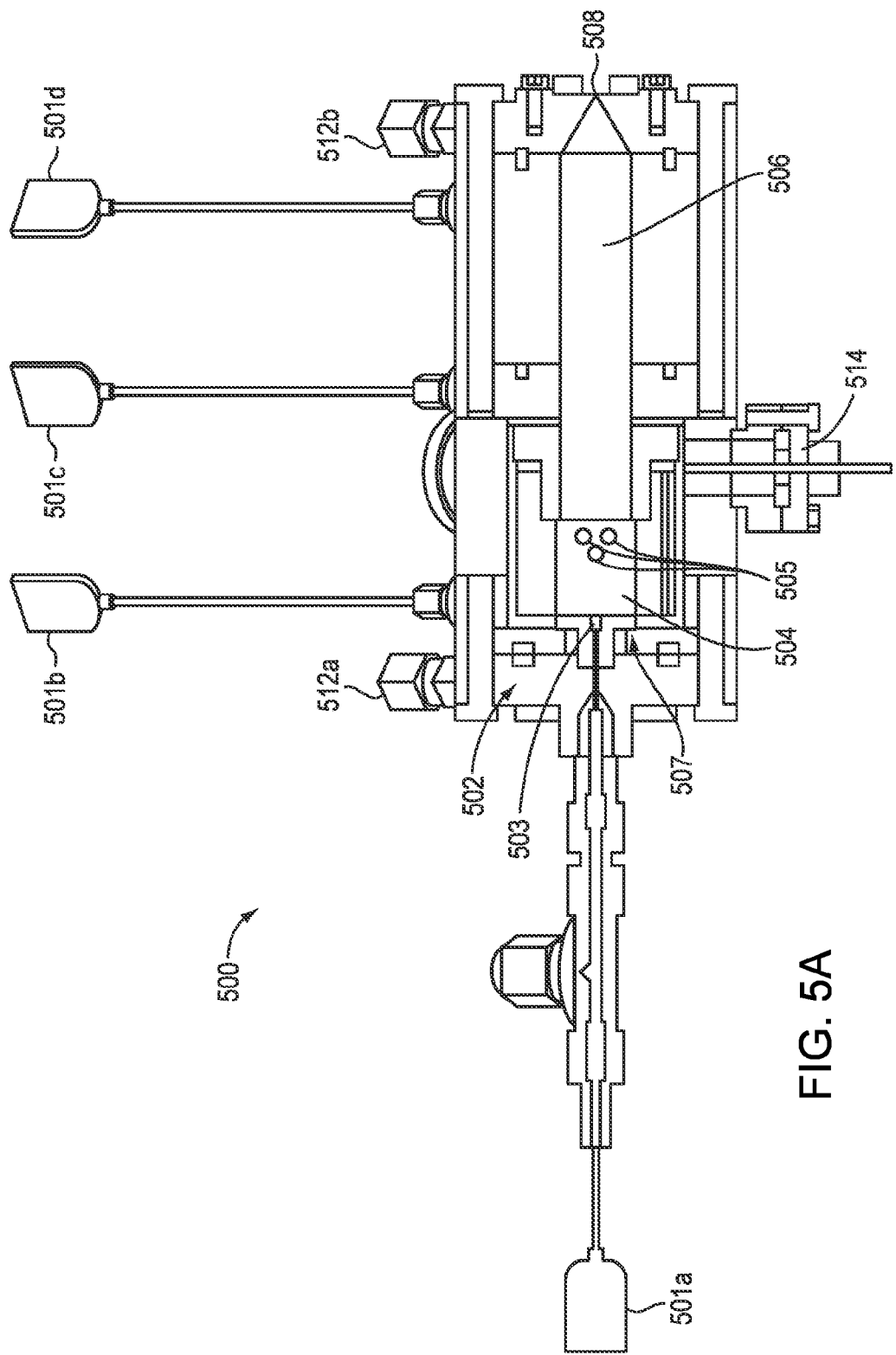
FIG. 5A is a diagram of a combustor device, according to an illustrative embodiment of the invention.

FIG. 5A is a diagram of a combustor device 500, according to an illustrative embodiment of the invention. The combustor device 500 includes a catalyst bed 504, hypergol coated catalyst granules 505, a monopropellant inlet 502, a monopropellant flow path 503 a monopropellant inlet orifice plate 507, a combustion chamber 506, a combustion chamber exit nozzle 508, combustion chamber temperature sensors 501c and 501d, a catalyst bed temperature sensor 501b, a monopropellant inlet orifice temperature sensor 501a, a cooling inlet 512a, a cooling outlet 512b, and a catalyst bed heater feedthrough 514.

The monopropellant inlet 502 is in fluid communication with the catalyst bed 504 via the monopropellant flow path 503. The catalyst bed 504 is in fluid communication with the combustion chamber 506. The catalyst bed 504, disposed within the combustion chamber 506 includes hypergol coated catalyst granules 505 disposed therein. The temperature sensors 501a, 501b, 501c, and 501d can monitor temperatures within the combustor device 500. The cooling inlet 512a and the cooling outlet 512b can inject a coolant into the combustor device 500. The catalyst bed heater feedthrough 514 can electrically heat the catalysts bed. During operation, a monopropellant is injected into the combustion chamber 506 via monopropellant inlet 502. The monopropellant flows along monopropellant flow path 503 into the catalyst bed. When the monopropellant comes into contact with the hypergol coated catalyst granules 505 in the catalyst bed for a duration (e.g., the time it takes the hypergol to ignite the monopropellant), the monopropellant is ignited by the hypergol. The hypergolic ignition of the monopropellant can cause a flame to be produced. The flame can exit the combustion chamber 506 via the combustion chamber exit nozzle 508. In addition to producing a flame, the ignited monopropellant can gives off sufficient heat to significantly raise the temperature of the catalyst bed 504. Upon being heated, the catalyst bed 504 can thermally activate the catalyst granules such that upon depletion of the hypergol coating, the thermally activated catalyst can sustain ignition of the injected monopropellant. In some embodiments, the catalyst is an iridium based catalyst. In some embodiments, the combustor device 500 is used in an aircraft emergency power unit application.

It is apparent to one of ordinary skill in the art that combustor device 500 is an example of a combustor device, and that other combustor devices can be used in accordance with embodiments of the present invention.

Figure 5B:
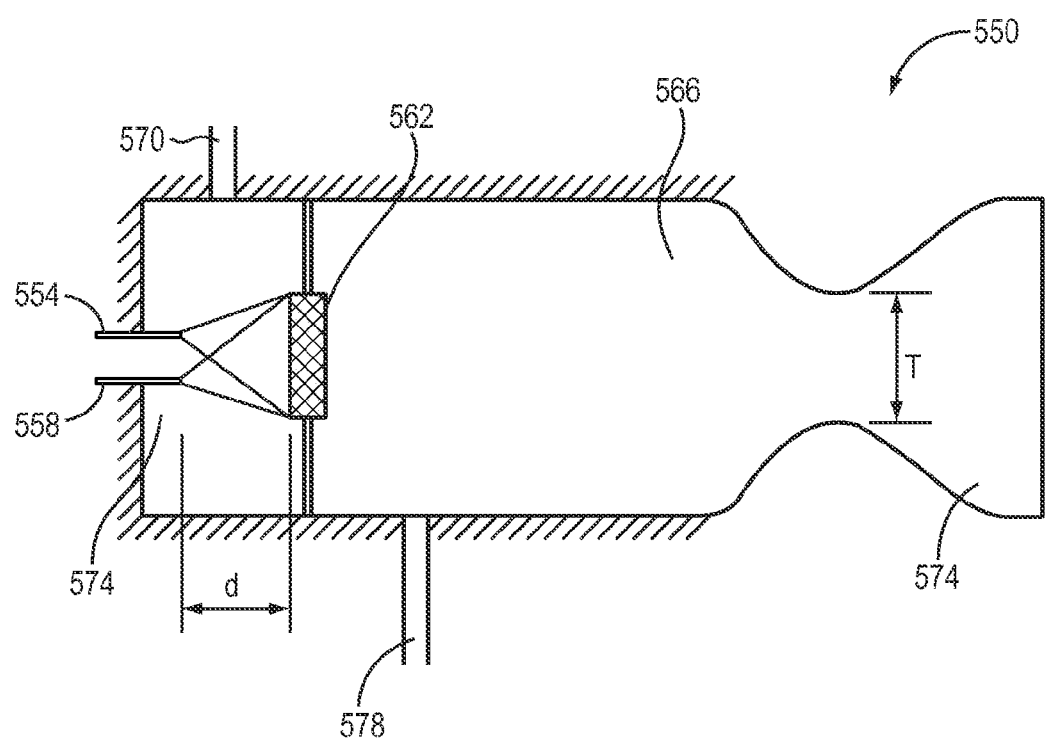
FIG. 5B is a diagram of a combustor device, according to an illustrative embodiment of the invention.

FIG. 5B is a diagram of a combustor device 550, according to an illustrative embodiment of the invention. The combustor device 550 includes a first monopropellant inlet 554, a hypergol inlet 558, a precombustion chamber 574, a pressurant gas inlet 570, an ignition plate 562 (e.g., stagnation plate), a main combustion chamber 566, a second monopropellant inlet 578, and a rocket nozzle 574.

The first monopropellant inlet 554, hypergol inlet 558, and pressurant gas inlet 570 are in fluid communication with the precombustion chamber 574. The second monopropellant inlet 578 is in fluid communication with the main combustion chamber 566. The ignition plate 562 is positioned between the precombustion chamber 574 and the main combustion chamber 566.

During operation, a monopropellant is injected into the precombustion chamber 574 via the first monopropellant inlet 554 and is incident upon ignition plate 562. A hypergol is injected into the precombustion chamber 574 via the hypergol inlet 558 and is incident upon the ignition plate 562. A pressurant gas is injected via pressurant gas inlet 570 into the precombustion chamber 574 to maintain a desired pressure within the precombustion chamber 574. While in contact with the ignition plate 562, the injected hypergol and monopropellant form a mixture and ignite. Upon ignition, combustion gases produced by the ignition can 562 pass through the ignition plate 562 and into the main combustion chamber 566. Further monopropellant can be injected into the main combustion chamber 566 via the second monopropellant inlet 578 and come into contact with the flame produced by the ignition in the precombustion chamber 574 and ignite. The combustion gases produced by the ignition in the main combustion chamber 566 can then exit the combustor device 550 via rocket nozzle 574.

In some embodiments, a distance d between the monopropellant inlet 554 and the ignition plate is chosen to optimize the ignition process in the precombustion chamber 574. In some embodiments, a distance T describing the waist of the rocket nozzle 574 is sized to set a pressure in the main combustion chamber 566 to approximately 1000 psi. In some embodiments, the ignition plate is a perforated plate or a foam. In some embodiments, the pressure in the precombustion chamber 574 (e.g. 1100 psi) is larger than the pressure in the main combustor chamber 566 (e.g. 1000 psi).

Figure 6:
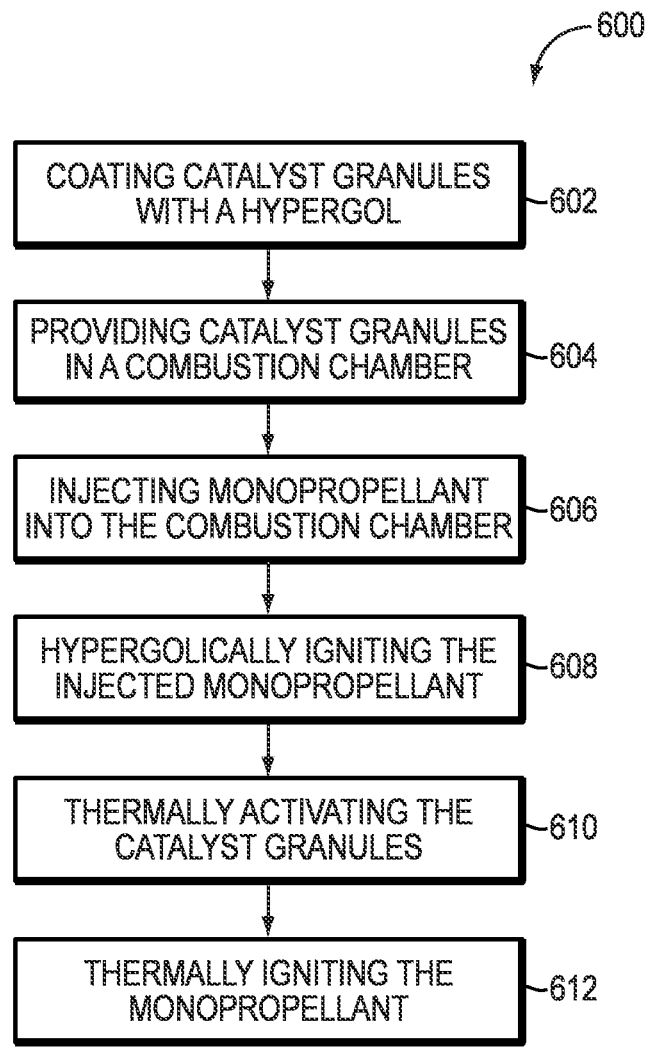
FIG. 6 is a flow diagram of a method for hypergolic ignition of a monopropellant in the presence of a catalyst, according to an illustrative embodiment of the invention.

FIG. 6 describes a method 600 for igniting a monopropellant, according to an illustrative embodiment of the present invention.

The method includes, coating catalyst granules with a hypergol (Step 602). In some embodiments, the hypergol coated catalyst granules include an iridium based catalyst. In some embodiments, coating the catalyst granules involves submerging the catalyst granules in an aqueous solution of the hypergol and evaporating the aqueous solution such that the catalyst granules are coated with the hypergol.

The method also includes providing hypergol coated catalyst granules (e.g., hypergol coated catalyst granules 505 as described above in FIG. 5) in a combustion chamber (e.g., combustion chamber 500 as described above in FIG. 5) (Step 604).

The method also includes injecting a monopropellant into the combustion chamber (Step 606). In some embodiments, the monopropellant is injected into the combustion chamber via a monopropellant inlet (e.g., monopropellant inlet 502 as described above in FIG. 5).

The method also includes thermally activating the catalyst granules (Step 610). When the monopropellant comes into contact with the coated catalyst granules after injection into the combustion chamber, hypergolic ignition can occur. The hypergolic ignition of the monopropellant can cause a temperature of the catalyst bed to rise. Upon being heated to a predetermined temperature, the catalyst bed can thermally ignite the catalyst granules.

The method also includes thermally igniting the monopropellant (Step 612). After a time duration (e.g., insert exemplary duration here), substantially all of the hypergol will evaporate off of the catalysts granules. Upon depletion of substantially all of the hypergol coating, the thermally activated catalyst granules can sustain ignition of the injected monopropellant.

Figure 7:
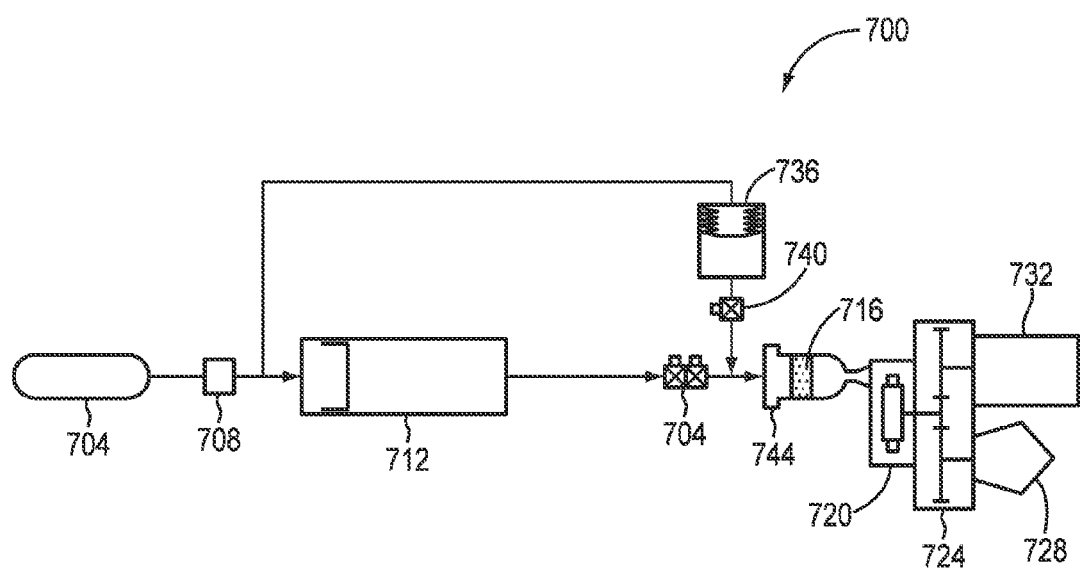
FIG. 7 is diagram of an emergency power unit (EPU), according to an illustrative embodiment of the invention.

FIG. 7 is a diagram of an emergency power unit (EPU) 700, in accordance with an illustrative embodiment of the present invention. The EPU includes a nitrogen bottle 704, a nitrogen valve 708, a fuel tank 712, fuel control valves 704, a combustion chamber 744, a catalyst 716, a turbine 720, a gearbox 724, an electric generator 732, a hydraulic pump 728, a hypergolic control valve 740, and a hypergolic injector 736.

The nitrogen valve 708 is in fluid communication with the nitrogen bottle 704, the hypergolic injector 736, and fuel tank 712. The fuel tank 712 is in fluid communication with the fuel control valves 704. The hypergolic injector 736 is in fluid communication with the hypergolic control valve 740. The hypergolic control valve 740 and the fuel control valve 704 are in fluid communication with the combustion chamber 744. The gas generator 718 is in fluid communication with the turbine 720. The turbine 720 is coupled to the gearbox 724. The gearbox 724 is coupled to the electric generator 732 and the hydraulic pump 728.

During operation, the nitrogen valve 708 opens to allow nitrogen from the nitrogen bottle 704 to pressurize the fuel tank 712 and the hypergolic injector 736. The fuel control valves 704 and the hypergolic control valve 740 open to allow a fuel from the fuel tank 712 and a hypergol from the hypergolic injector 736 to be injected into the combustion chamber 744. Once inside the combustion chamber 744, the monopropellant is hypergolically ignited and can produce combustion gasses. The combustion gasses can flow into the turbine 720. When the combustion gases flow into the turbine, the combustion gases can impart a rotational mechanical energy to the turbine 720 (e.g., the force of the combustion gases flowing into the turbine 720 can cause a wheel or rotor (not shown) of the turbine 720 to turn). The turbine 720 can drive the gearbox 724. The gearbox 724 can drive the electric generator 732 and/or the hydraulic pump 728.

In some embodiments, the hypergolic injector 736 and the hypergolic control valve 740 are not used, and instead hypergol coated catalyst granules 716 are placed within combustion chamber 744. In these embodiments, upon injection of the monopropellant into combustion chamber 744 via fuel control valves 704, the monopropellant is ignited by the hypergol coating on the catalyst granules and after the hypergol coating is depleted, the heated catalyst maintains thermal ignition of the monopropellant.

Figure 8:
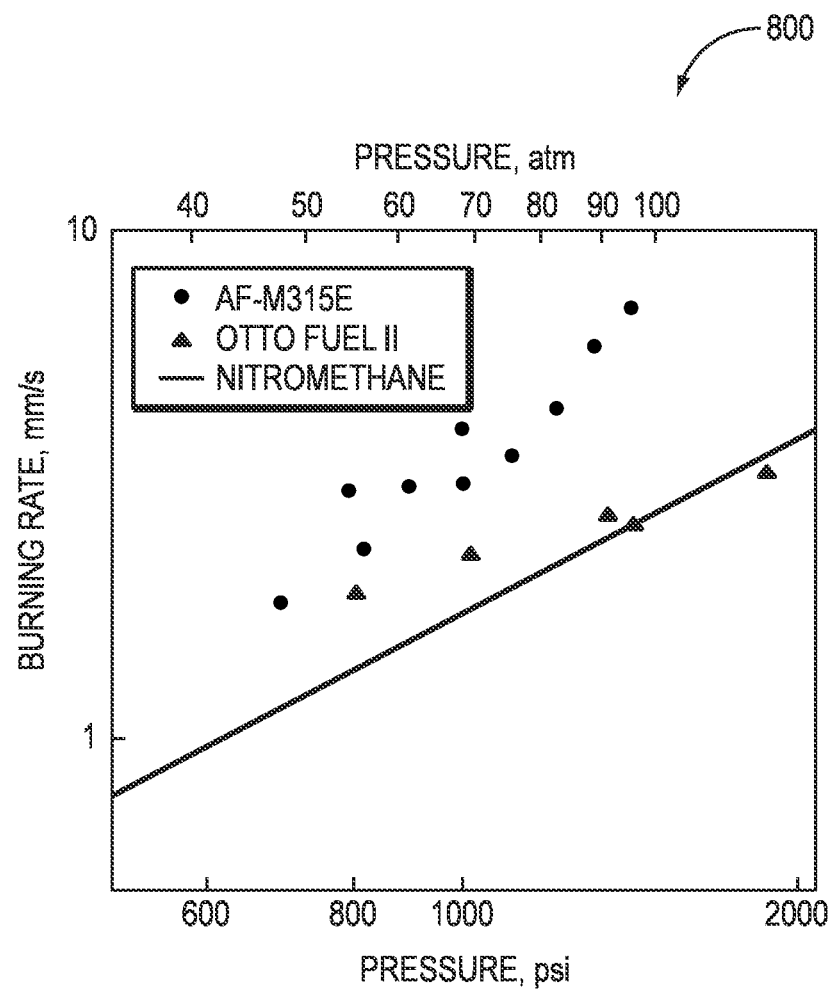
FIG. 8 is graph of burn rate of AF-M315 ionic liquid monopropellant plotted against the combustion chamber pressure, according to an illustrative embodiment of the invention.

FIG. 8 is a graph 800 of exemplary burn rates (e.g., burning rate) within a combustion chamber for exemplary monopropellants versus exemplary combustion chamber pressures for monopropellants ignited using a hypergol. A linear burn rate can be higher and can increase faster with pressure than for a commonly used non-ionic monopropellant, hydrazine.

For a monopropellant that is AF-M315E, at a pressure of 800 psi, the burning rate is approximately 2.5 mm/s, higher and increasing faster with pressure than for a commonly used non-ionic monopropellant, hydrazine. For a monopropellant that is nitromethane, at a pressure of 800 psi, the burning rate is approximately 1.5 mm/s. For a monopropellant that is Otto Fuel II at a pressure of 800 psi, the burning rate is approximately 2 mm/s.

In some embodiments, a linear burn rate as a function of pressure can be determined as follows:

$$\text{Linear Burn Rate (mm/s)} = 2.85 \times 10^{-5} \cdot P(\text{psi})^{1.7} \quad \text{(EQN. 1)}$$

where P is the combustion chamber pressure, and the Linear Burn Rate is the rate at which an AF-M315E monopropellant burns within the combustion chamber. A mass burn rate per unit area (g/cm$^2$/s) can be determined as follows:

$$\text{Mass Burn Rate (g/cm}^2\text{/s)} = 4.16 \times 10^{-6} \cdot P(\text{psi})^{1.7} \quad \text{(EQN. 2)}$$

where P is the combustion chamber pressure, and the Mass Burn Rate is the rate at which energy is released from a flame.

Figure 9:
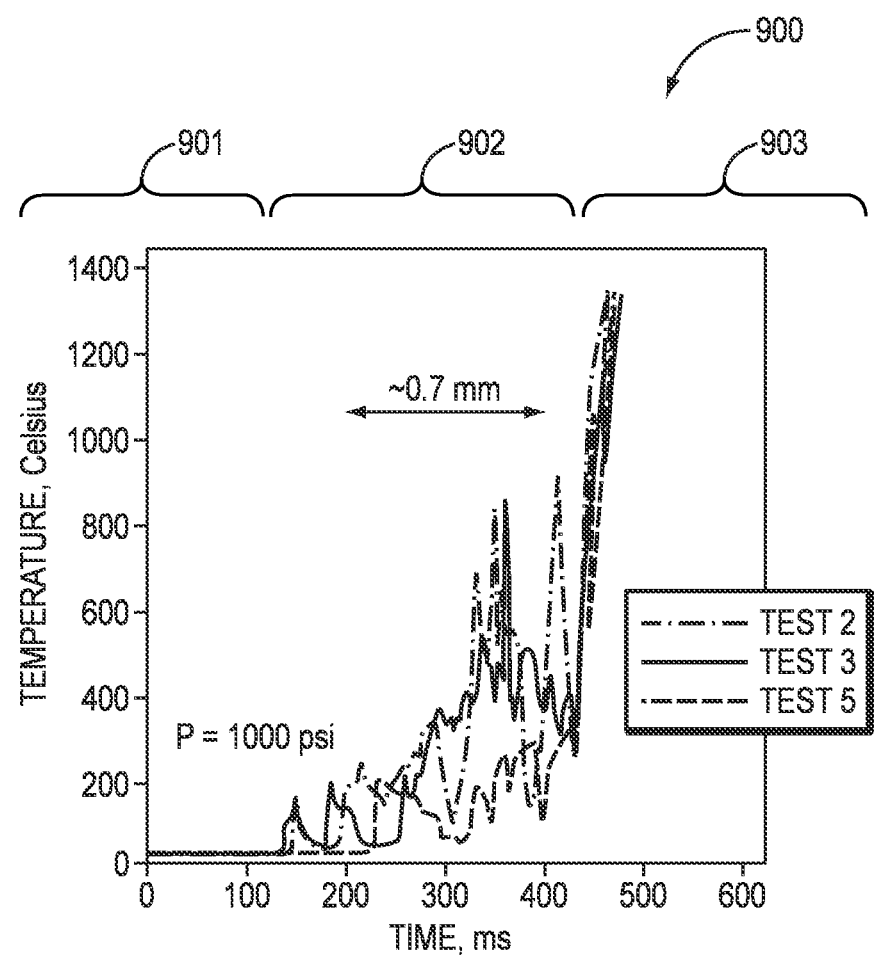
FIG. 9 is graph of temperature versus time during flame propagation after a hypergolic ignition, according to an illustrative embodiment of the invention.

FIG. 9 is graph 900 of temperature versus time of flame propagation over a hypergolic ignition, according to an illustrative embodiment of the invention. The graph 900 includes three regions. A first region 901 corresponds to the temperature of the flame when a monopropellant is in a liquid state. A second region 902 corresponds to the temperature of the flame when the monopropellant is in a liquid and gaseous state. The third region 903 corresponds to the temperature of the flame when the monopropellant in a gaseous state.

Hypergolic ignition occurs in a liquid state (e.g., the first region 901). In the first region 901, prior to ignition (e.g., time less than approximately 150 seconds) the temperature of the monopropellant is approximately 0° C. As the hypergol and the propellant mix form a high temperature gaseous product, a luminous flame ignites. The flame heats the liquid ahead of it, raising its temperature and forming a two-phase region (e.g., the second region 902) as water content of the monopropellant vaporizes. In this second region, at temperatures ranging from 200 to 400° C., the monopropellant decomposition begins as indicated by the very rapid rise in temperature that begins in the second region 902. In the second region 902, at a time of approximately 300 ms, the temperature is approximately 400° C. Self-sustaining propagation of flame within the monopropellant occurs as it decomposes. The monopropellant decomposition produces a hot, luminous gaseous zone (e.g., the third region 903). In the third region 903, at a time of approximately 500 ms, the temperature is approximately 1350° C.

Figure 10:
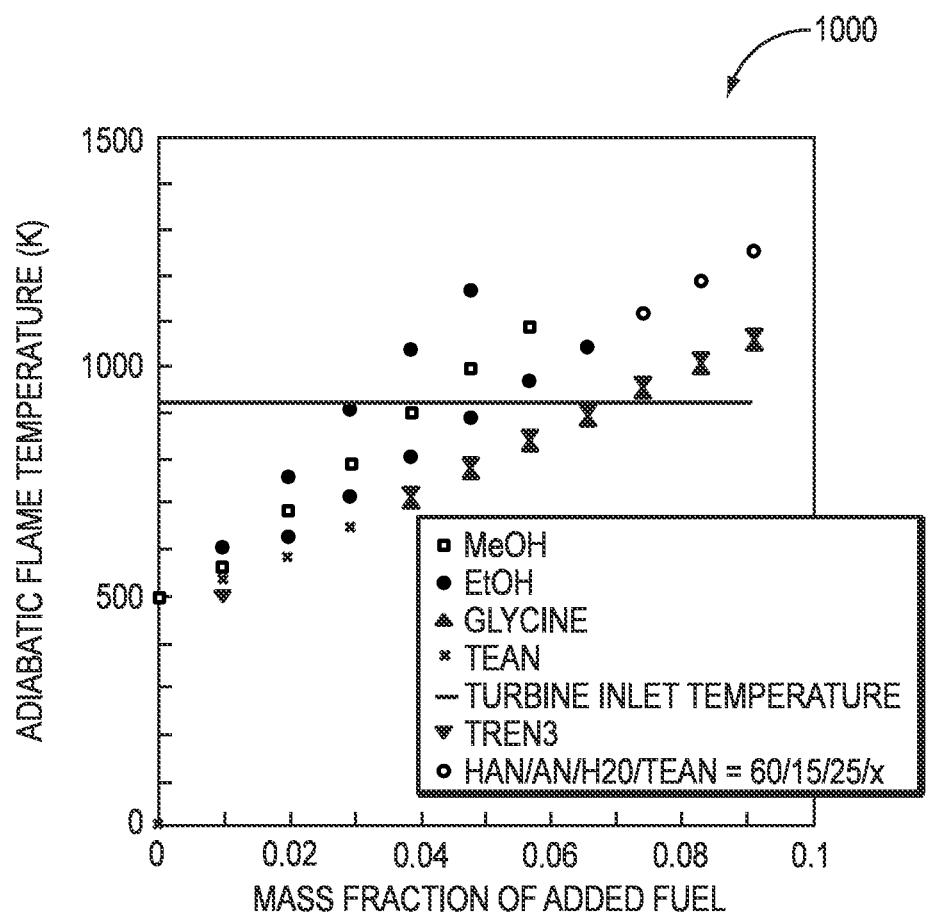
FIG. 10 is graph of adiabatic flame temperature as a function of fuel composition, for an aircraft EPU application, according to an illustrative embodiment of the invention.

FIG. 10 is graph 100 of adiabatic flame temperature as a function of fuel composition, according to an illustrative embodiment of the invention. The fuel compositions include various HAN-fuel-water mixtures and the fuels TEAN and TREN3. For example, for a HAN-fuel-water mixture of EtOH and a mass fraction of added fuel of 0.02, the adiabatic flame temperature is approximately 700° K. For a HAN-fuel-water mixture of MeOH and a mass fraction of added fuel of 0.02, the adiabatic flame temperature is approximately 700° K For a HAN-fuel-water mixture of Glycine and a mass fraction of added fuel of 0.02, the adiabatic flame temperature is approximately 600° K For a HAN-fuel-water mixture of TREN3 and a mass fraction of added fuel of 0.02, the adiabatic flame temperature is approximately 600° K. For a HAN-fuel-water mixture of TEAN and a mass fraction of added fuel of 0.02, the adiabatic flame temperature is approximately 600° K. In some embodiments, the graph 100 is useful in describing an aircraft EPU application.

FIGS. 11A through FIG. 13 are graphs showing crucible temperature and system pressure over time, according to illustrative embodiments of the invention. FIGS. 11A through FIG. 12B show temperature and pressure rising due to repeated hypergolic ignition of a HAN-based monopropellant incorporating a fuel component, plotted against time, according to illustrative embodiment of the invention.

Figure 11A:
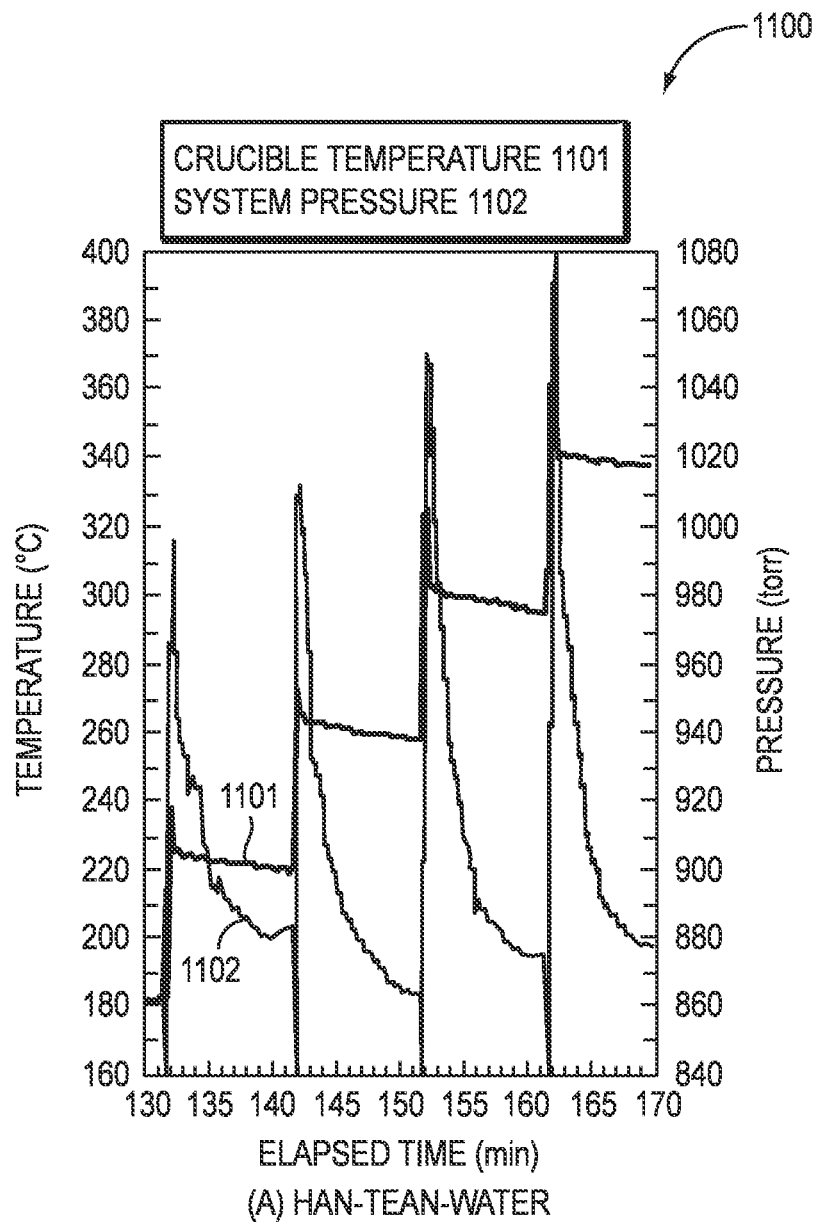
FIGS. 11A through FIG. 12(b) are graphs showing temperature and pressure over time, according to illustrative embodiment of the invention.

More specifically, FIG. 11A is a graph 1100 showing exemplary crucible temperature 1101 and exemplary system pressure 1102 as a function of time. The graph 1100 shows repetitive ignition of HAN-TEAN-Water propellant mixtures over a 405 catalyst that is heated to approximately 200° C. Ignition can occur at each dosing (e.g., 500 µl of propellant) of the catalyst and complete combustion (e.g., decomposition) of the propellant can occur. For an elapsed time of 140 minutes, the crucible temperature 1101 is approximately 220° C. and the system pressure 1102 is approximately 880 torr.

Figure 11B:
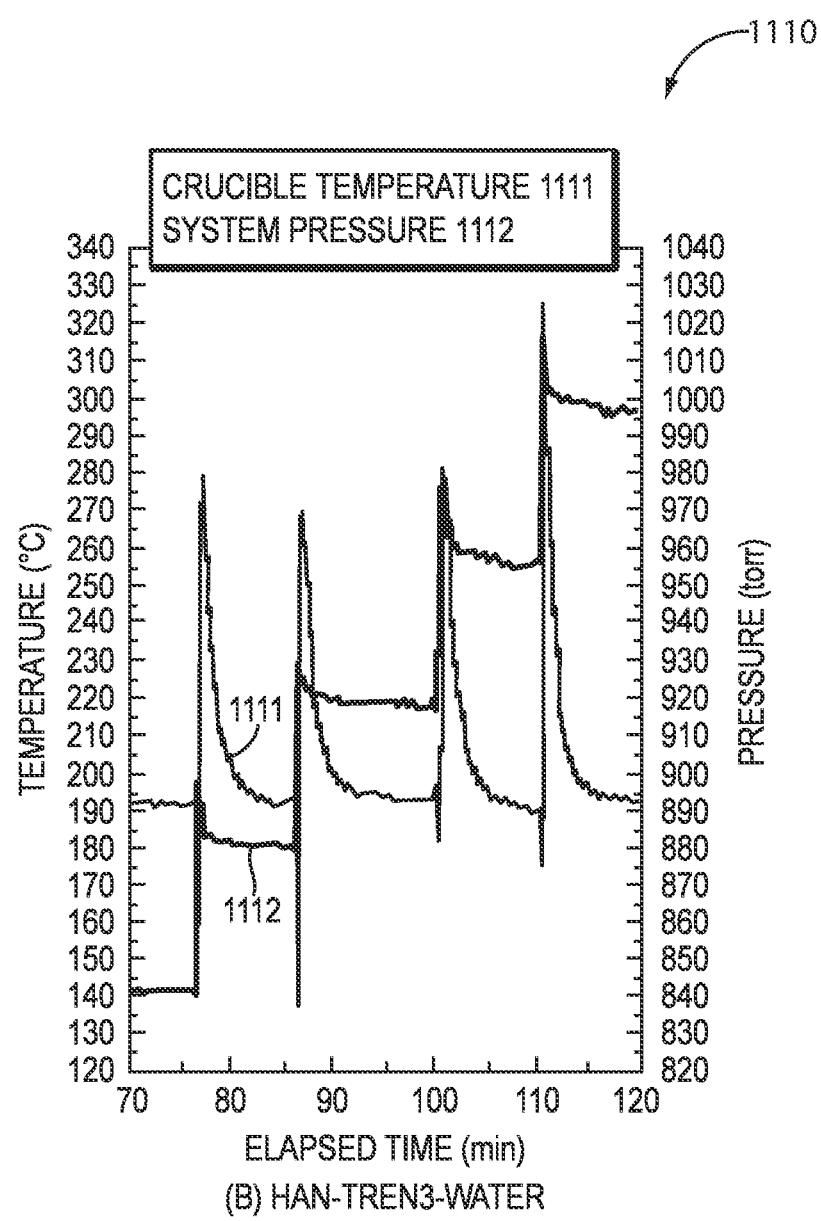

FIG. 11B is a graph 1110 showing exemplary crucible temperature 1111 and exemplary system pressure 1112 as a function of time. The graph 1110 shows repetitive ignition of HAN-TREN3-Water propellant mixtures over a 405 catalyst that is heated to approximately 200° C. Ignition can occurred at each dosing (500 µl of propellant) of the catalyst and complete combustion (e.g., decomposition) of the propellant can occur. For an elapsed time of 100 minutes, the crucible temperature 1111 is approximately 195° C. and the system pressure 1112 is approximately 920 torr.

Figure 12A:
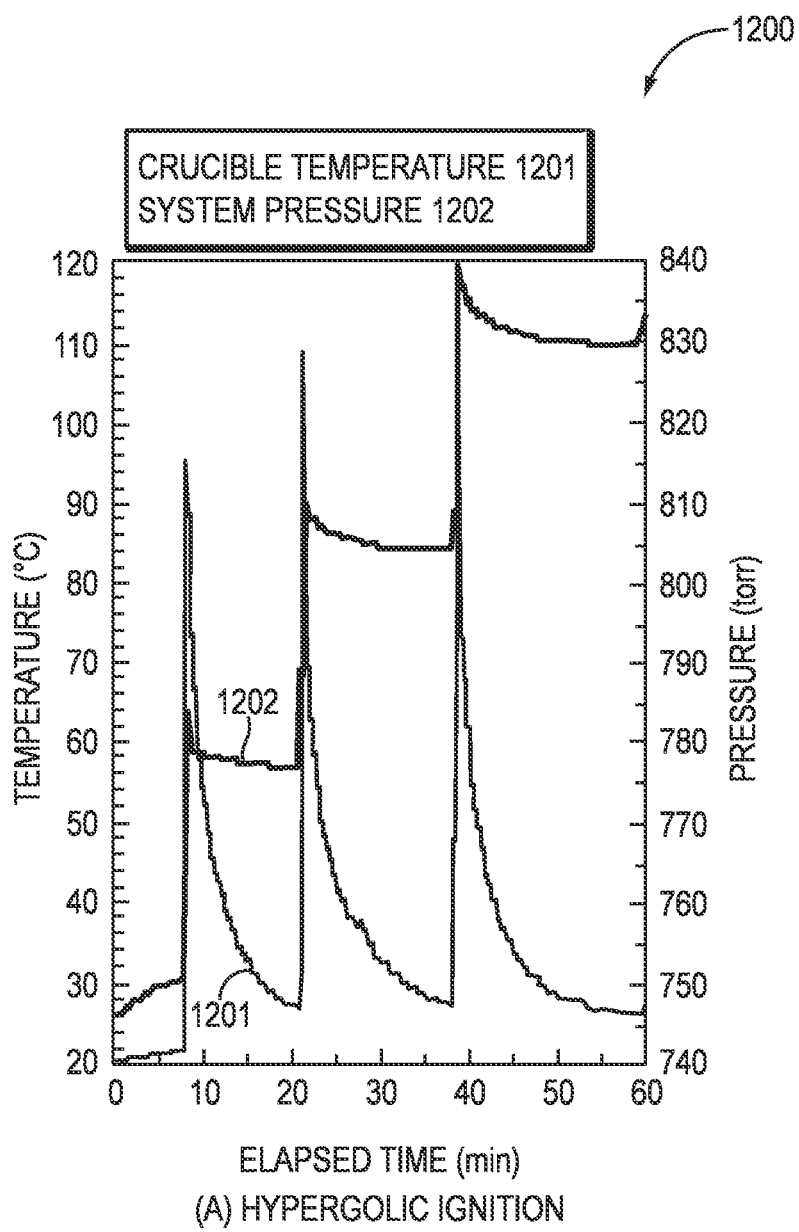

FIG. 12A is a graph 1200 showing exemplary crucible temperature 1201 and exemplary system pressure 1202 as a function of time. The graph 1200 shows a hypergolic ignition of HAN-TREN3-Water propellant mixture, the propellant mixture is at room temperature. The hypergolic ignition can cause a fume-off of the propellant. For an elapsed time of 30 minutes, the crucible temperature 1201 is approximately 35° C. and the system pressure 1202 is approximately 805 torr.

Figure 12B:
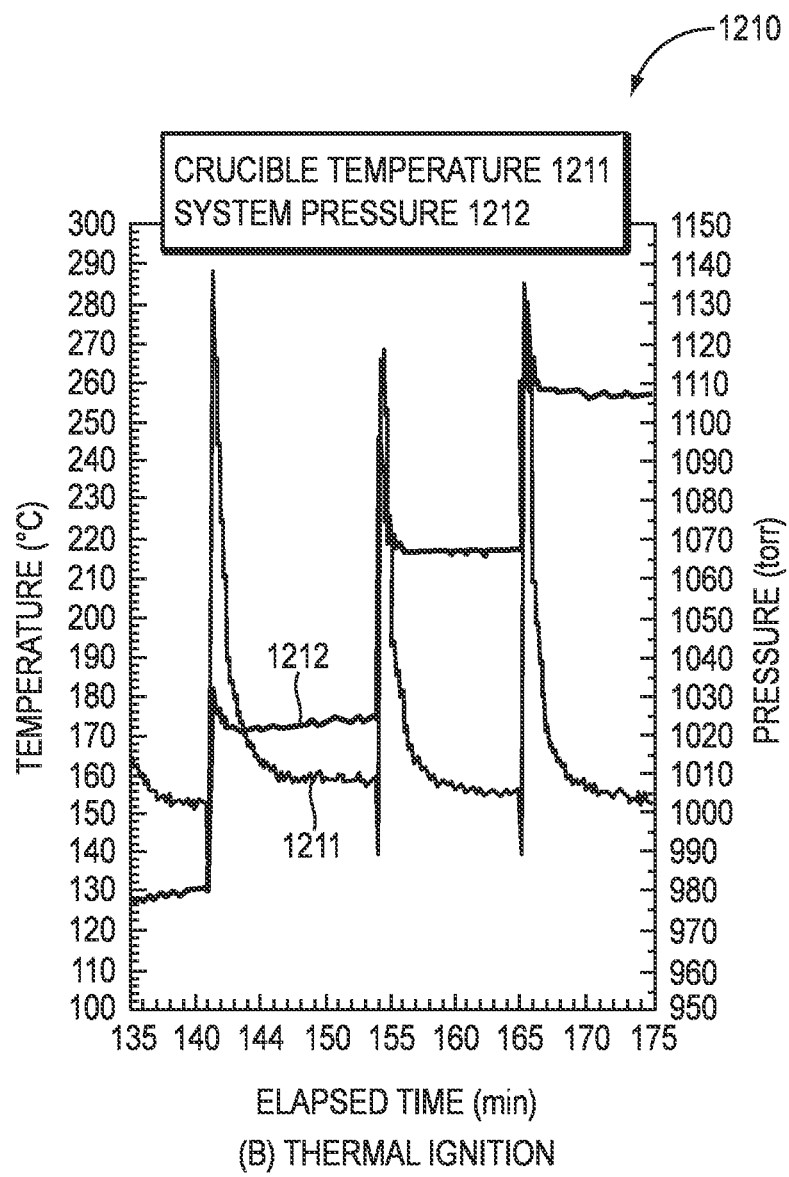

FIG. 12B is a graph 1210 showing exemplary crucible temperature 1211 and exemplary system pressure 1212 as a function of time. The graph 1210 shows a thermal ignition of HAN-TREN3-Water propellant mixture, the propellant mixture at room temperature. For an elapsed time of 150 minutes, the crucible temperature 1211 is approximately 160° C. and the system pressure 1212 is approximately 1025 torr.

Figure 13:
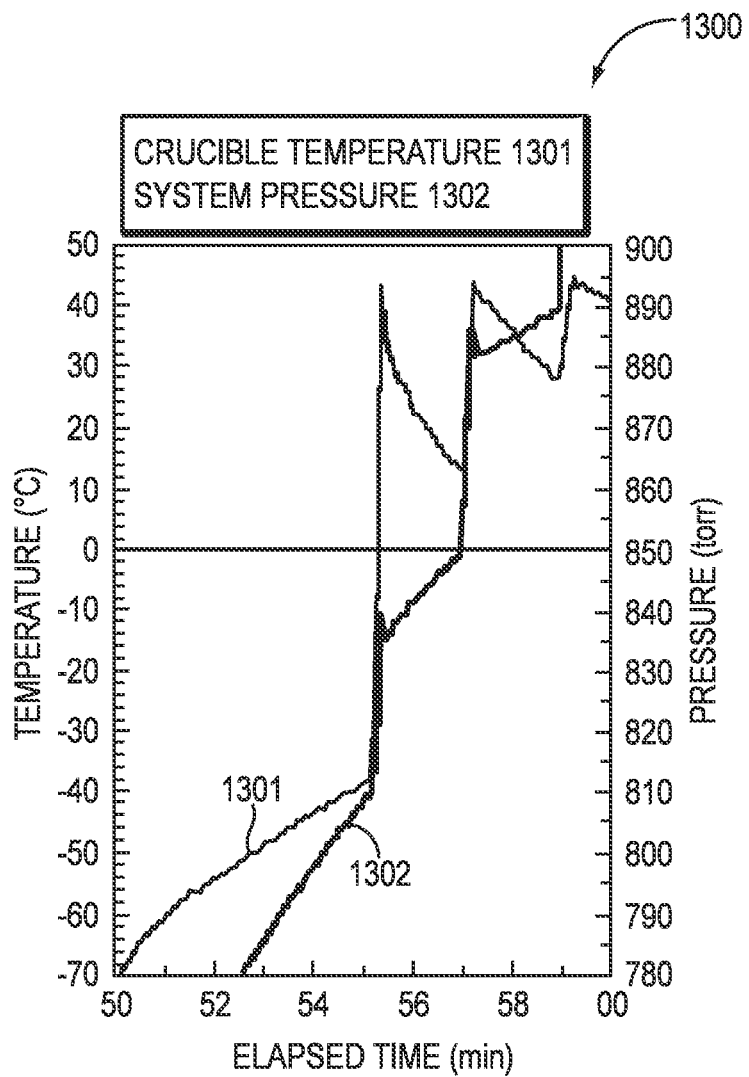
FIG. 13 is a graph showing hypergolic ignition of HAN-based monopropellant versus temperature, according to illustrative embodiment of the invention.

FIG. 13 is a graph 1300 showing exemplary crucible temperature 1301 and exemplary system pressure 1302 as a function of time. FIG. 13 shows that hypergolic ignition of HAN-based monopropellants can be initiated at temperatures as low as −40 C, according to an illustrative embodiment of the invention. The graph 1300 shows a hypergolic ignition of a HAN/REN3/Water formulation at a temperature of −40° C. that is in presence of a 405 catalyst that is coated with a hypergol of iodine pentoxide. For an elapsed time of 58 minutes, the crucible temperature 1301 is approximately 35° C. and the system pressure 1302 is approximately 885 torr.

Figure 14:
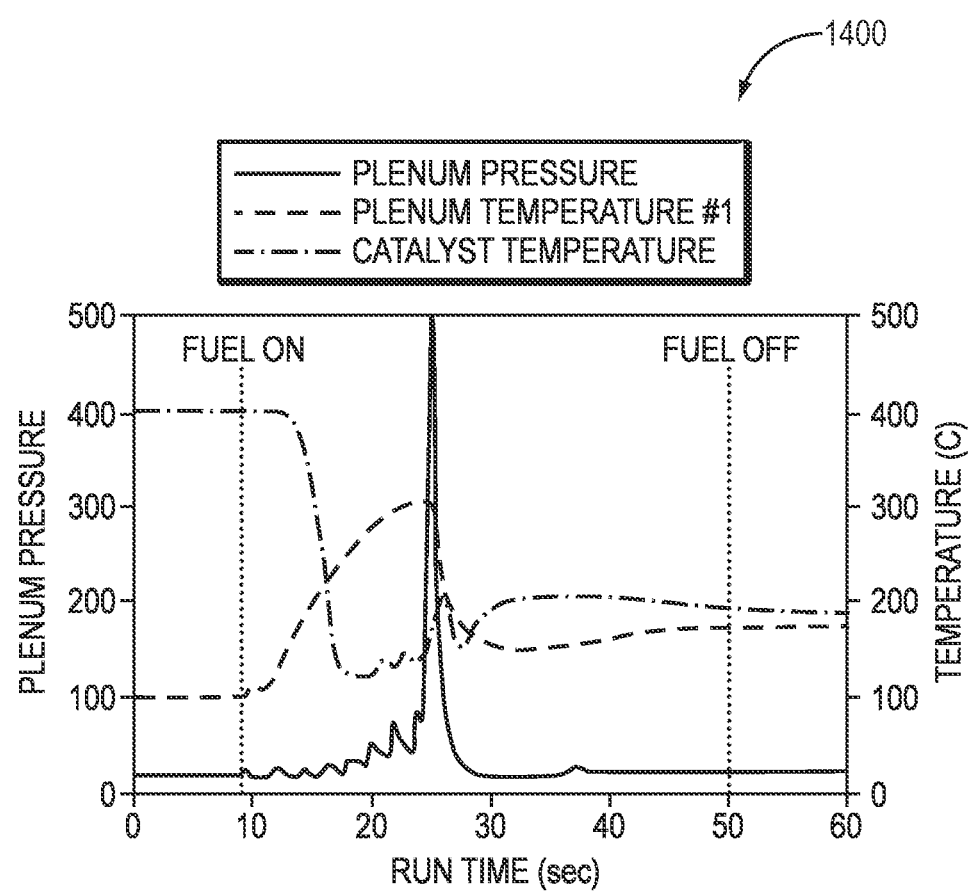
FIGS. 14 and 15 are graphs showing plenum pressure, plenum temperature, and hypergol-coated catalyst temperature over time, according to illustrative embodiments of the invention.
Figure 15:
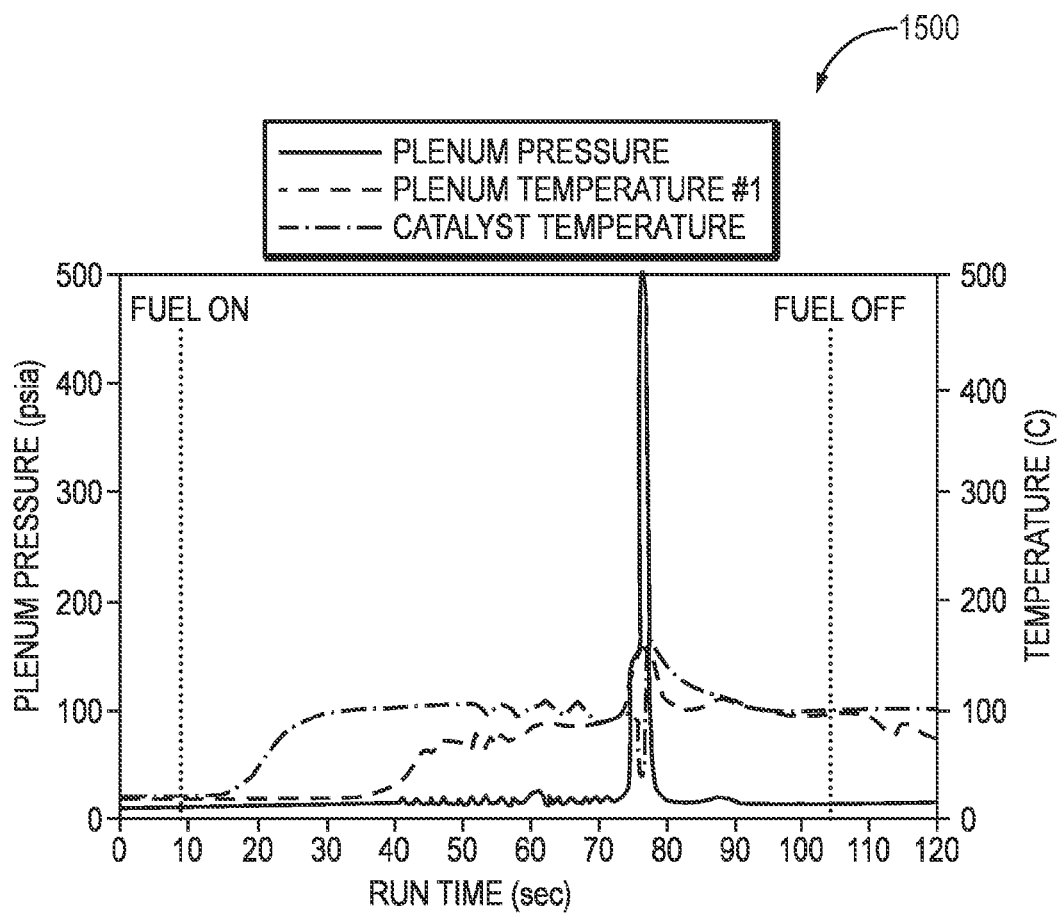

FIGS. 14 and 15 are graphs showing plenum pressure, plenum temperature, and solid hypergol coated catalyst temperature over time, for example, for the device shown in FIG. 5A, according to illustrative embodiments of the invention.

More specifically, FIG. 14 is a graph 1400 showing exemplary plenum pressures (e.g., the pressure in a combustion chamber), plenum temperatures (e.g., the temperature in a combustion chamber), and catalyst temperatures as a function of time when a fuel is ignited with a catalyst only (i.e., without the use of a hypergol in the combustion chamber). The catalyst can be preheated to ~400° C. As shown in graph 1400, when the monopropellant flow is turned on, the plenum temperature decreases. Once the monopropellant ignites (e.g., at a time of approximately 24 s), the plenum temperature and pressure increase. For a run time of 20 seconds, the plenum pressure is approximately 50 psi, the plenum temperature is approximately 250° C., and the catalyst temperature is approximately 130° C.

FIG. 15 is a graph 1500 showing exemplary plenum pressures (e.g., the pressure in a combustion chamber), plenum temperatures (e.g., the temperature in a combustion chamber), and catalyst temperatures as a function of time when a catalyst is mixed with a small amount of hypergol (e.g., iodine pentoxide) within the combustion chamber. The catalyst and plenum temperature and plenum pressure rise upon turning on the monopropellant flow. For a run time of 20 seconds, the plenum pressure is approximately 10 psi, the plenum temperature is approximately 60° C., and the catalyst temperature is approximately 100° C. The terminology used herein is for the purpose of describing particular embodiments and is not intended to be limiting of the inventive concepts. It will be understood that, although the terms first, second, third etc. are used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present application.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A catalyst-free method of igniting an ionic liquid, comprising:
   mixing a liquid hypergol with a HAN-based ionic liquid to ignite the HAN-based ionic liquid in the absence of a catalyst;
   injecting the HAN-based ionic liquid and the liquid hypergol into a combustion chamber;
   discontinuing the injection of the liquid hypergol such that a stagnation plate thermally maintains the ignited the HAN-based ionic liquid.

2. The method of claim 1 wherein the HAN-based ionic liquid and the liquid hypergol impinge upon a stagnation plate positioned at a top portion of the combustion chamber.

3. The method of claim 2 wherein the stagnation plate comprises a wire mesh, a foam, a perforated plate, a solid plate, or any combination thereof.

4. The method of claim 2 wherein a flow path of the HAN-based ionic liquid and the liquid hypergol within the combustion chamber is perpendicular to a top surface of the stagnation plate.

5. The method of claim 1 further comprising injecting the liquid hypergol into the combustion chamber to reignite the HAN-based ionic liquid if the stagnation plate fails to thermally maintain the ignition of the HAN-based ionic liquid.

6. The method of claim 2 wherein a flow path of the HAN-based ionic liquid and the liquid hypergol into the combustion chamber is transverse to a top surface of the combustion chamber.

7. The method of claim 2 wherein a flow path of the HAN-based ionic liquid and the liquid hypergol into the combustion chamber is perpendicular to a top surface of the stagnation plate.

8. The method of claim 1 wherein the hypergol includes a compound selected from the group consisting of: nitronium, nitrosonium salts, hypohalite compounds, heavy metals and their salts, $NO_2BF_4$, $NOBF_4$, $NO_2ClO_4$, $NO_2ClF_4$, $I_2O_5$, $I_2O_6$, $I_2O_7$, HOCl, HOBr, HOI, [NaOClÿNaOH], Fe, Cu, powdered Zn, $Fe(NO_3)_3$, $FeCl_3$, $MnO_2$ and $KMnO_4$.

9. The method of claim 3 wherein the stagnation plate comprises a metal, a non-metal, a ceramic, or any combination thereof.

10. The method of claim 1 wherein a mass flow ratio of the hypergol to the propellant injected into the combustion chamber ranges between 0 and 0.5.

11. The method of claim 1 wherein the HAN-based ionic liquid includes a fuel component.

12. The method of claim 1 wherein the HAN-based ionic liquid includes a fuel component and water in a ratio of about 64:8:28.

13. The method of claim 1 wherein the HAN-based ionic liquid includes AF-M315E monopropellant.

14. The method of claim 1 wherein the liquid hypergol includes an aqueous solution of iodine pentoxide.

15. The method of claim 1 further comprising pressurizing the combustion chamber to at least 500 psi.

16. The method of claim 11 wherein the fuel component includes triethenolammonium nitrate (TEAN) or tris(amoniethyl)amine trinitrate (TREN3).

17. The method of claim 14 wherein the liquid hypergol is a 50-50 wt % solution of iodine pentoxide and water.

18. The method of claim 12 wherein the fuel component includes triethenolammonium nitrate (TEAN) or tris(amoniethyl)amine trinitrate (TREN3).

19. A catalyst-free method of igniting an ionic liquid, comprising:
   mixing a liquid hypergol with a HAN-based ionic liquid to ignite the HAN-based ionic liquid in the absence of a catalyst;
   injecting the HAN-based ionic liquid and the liquid hypergol into a combustion chamber;
   discontinuing the injection of the liquid hypergol such that ignition of the HAN-based ionic liquid is thermally maintained.

20. The method of claim 19 wherein the HAN-based ionic liquid and the liquid hypergol impinge upon a stagnation plate positioned at a top portion of the combustion chamber.

21. The method of claim 20 wherein the stagnation plate comprises a wire mesh, a foam, a perforated plate, a solid plate, or any combination thereof.

22. The method of claim 20 wherein a flow path of the HAN-based ionic liquid and the liquid hypergol within the combustion chamber is perpendicular to a top surface of the stagnation plate.

23. The method of claim 19 further comprising injecting the liquid hypergol into the combustion chamber to reignite the HAN-based ionic liquid if the stagnation plate fails to thermally maintain the ignition of the HAN-based ionic liquid.

24. The method of claim 20 wherein a flow path of the HAN-based ionic liquid and the liquid hypergol into the combustion chamber is transverse to a top surface of the combustion chamber.

25. The method of claim 20 wherein a flow path of the HAN-based ionic liquid and the liquid hypergol into the combustion chamber is perpendicular to a top surface of the stagnation plate.

26. The method of claim 19 wherein the hypergol includes a compound selected from the group consisting of: nitronium, nitrosonium salts, hypohalite compounds, heavy metals and their salts, $NO_2BF_4$, $NOBF_4$, $NO_2ClO_4$, $NO_2ClF_4$, $I_2O_5$, $I_2O_6$, $I_2O_7$, HOCl, HOBr, HOI, [NaOClÿNaOH], Fe, Cu, powdered Zn, $Fe(NO_3)_3$, $FeCl_3$, $MnO_2$ and $KMnO_4$.

27. The method of claim 21 wherein the stagnation plate comprises a metal, a non-metal, a ceramic, or any combination thereof.

28. The method of claim 19 wherein a mass flow ratio of the hypergol to the propellant injected into the combustion chamber ranges between 0 and 0.5.

29. The method of claim 19 wherein the HAN-based ionic liquid includes a fuel component.

30. The method of claim 19 wherein the HAN-based ionic liquid includes a fuel component and water in a ratio of about 64:8:28.

31. The method of claim 19 further comprising pressurizing the combustion chamber to at least 500 psi.

32. A catalyst-free method of igniting an ionic liquid, comprising:
mixing a liquid hypergol with a HAN-based ionic liquid to ignite the HAN-based ionic liquid in the absence of a catalyst;
injecting the HAN-based ionic liquid and the liquid hypergol into a combustion chamber;
discontinuing the injection of the liquid hypergol such that a mixing device thermally maintains the ignited HAN-based ionic liquid.

33. The method of claim 32 wherein the HAN-based ionic liquid and the liquid hypergol impinge upon the mixing device positioned at a top portion of the combustion chamber.

34. The method of claim 33 wherein a flow path of the HAN-based ionic liquid and the liquid hypergol within the combustion chamber is perpendicular to a top surface of the mixing device.

35. The method of claim 32 further comprising injecting the liquid hypergol into the combustion chamber to reignite the HAN-based ionic liquid if the mixing device fails to thermally maintain the ignition of the HAN-based ionic liquid.

36. The method of claim 33 wherein a flow path of the HAN-based ionic liquid and the liquid hypergol into the combustion chamber is transverse to a top surface of the combustion chamber.

37. The method of claim 33 wherein a flow path of the HAN-based ionic liquid and the liquid hypergol into the combustion chamber is perpendicular to a top surface of the mixing device.

38. The method of claim 32 wherein the hypergol includes a compound selected from the group consisting of: nitronium, nitrosonium salts, hypohalite compounds, heavy metals and their salts, $NO_2BF_4$, $NOBF_4$, $NO_2ClO_4$, $NO_2ClF_4$, $I_2O_5$, $I_2O_6$, $I_2O_7$, HOCl, HOBr, HOI, [NaOClÿNaOH], Fe, Cu, powdered Zn, $Fe(NO_3)_3$, $FeCl_3$, $MnO_2$ and $KMnO_4$.

39. The method of claim 34 wherein the mixing device comprises a metal, a non-metal, a ceramic, or any combination thereof.

40. The method of claim 32 wherein a mass flow ratio of the hypergol to the propellant injected into the combustion chamber ranges between 0 and 0.5.

41. The method of claim 32 wherein the HAN-based ionic liquid includes a fuel component.

42. The method of claim 32 wherein the HAN-based ionic liquid includes a fuel component and water in a ratio of about 64:8:28.

43. The method of claim 32 further comprising pressurizing the combustion chamber to at least 500 psi.

* * * * *